United States Patent [19]

Messerich et al.

[11] Patent Number: 4,742,467
[45] Date of Patent: May 3, 1988

[54] AUTOMATED PROGRAMMING SYSTEM FOR MACHINE CREATION OF APPLICATIONS PROGRAM SOURCE CODE FROM NON-PROCEDURAL TERMINAL INPUT

[75] Inventors: Patrick J. Messerich; Ian H. Abel, both of Minneapolis; Victor C. Benda, Edina; Charles E. Clark, Bloomington; Richard A. Ferrera, Burnsville, all of Minn.; Joe O. Ross, Birmingham, Ala.; Peter C. Patton, Cedar Park, Tex.; George E. Sundem, Fridley, Minn.

[73] Assignee: Analysts International Corporation, Minneapolis, Minn.

[21] Appl. No.: 917,296

[22] Filed: Oct. 9, 1986

Related U.S. Application Data

[63] Continuation of Ser. No. 607,238, May 4, 1984, abandoned.

[51] Int. Cl.$^4$ .......................... G06F 9/00; G06F 11/00
[52] U.S. Cl. .................................... 364/200; 364/300; 371/19
[58] Field of Search ............... 364/300, 200 MS File, 364/900 MS File; 371/16, 17, 19

[56] References Cited

U.S. PATENT DOCUMENTS

| | | | |
|---|---|---|---|
| 3,969,722 | 7/1976 | Danco et al. | 364/200 |
| 3,969,723 | 7/1976 | Kennicott | 364/200 |
| 4,204,253 | 5/1980 | Van Den Hanenberg | 364/200 |
| 4,227,245 | 10/1980 | Edblad et al. | 364/468 |
| 4,232,370 | 11/1980 | Tapley | 364/478 |
| 4,244,034 | 1/1981 | Cherba | 364/900 |
| 4,247,901 | 1/1981 | Martin et al. | 364/900 |
| 4,263,651 | 4/1981 | Donath | 364/300 |
| 4,315,315 | 2/1982 | Kossiakoff | 364/300 |
| 4,389,706 | 6/1983 | Gomola et al. | 364/130 |
| 4,445,169 | 4/1984 | Wakita et al. | 364/147 |
| 4,455,619 | 6/1984 | Masui | 364/900 |
| 4,533,997 | 8/1985 | Furgerson | 364/200 |
| 4,536,840 | 8/1985 | Borta | 364/300 |

FOREIGN PATENT DOCUMENTS 2941824  4/1980  Fed. Rep. of Germany ...... 364/900

Primary Examiner—Archie E. Williams, Jr.
Assistant Examiner—Thomas C. Lee
Attorney, Agent, or Firm—Merchant, Gould, Smith, Edell, Welter & Schmidt

[57] ABSTRACT

An automated method and apparatus are used for creating data processing application programs in programmer oriented languages such as COBOL from atomic or fundamental program building blocks, i.e., individual programming language statements, based on information provided by the user at the terminal. Host/peripheral input/output subroutines are selected from a library of existing I/O subroutines, based on the type of I/O indicated by the user; and, the application program can incorporate existing subroutines, tables, files, etc. so as to avoid having to create code which has already been created. The system also provides for a level of validity checks and interactive editing of the application program as it is being created at the terminal. A user may thus change some aspect of the application program, or correct a logic error which has been detected by the system, interactively without having to start over from scratch after compiling the source program to detect errors.

10 Claims, 36 Drawing Sheets

Microfiche Appendix Included
(21 Microfiche, 1968 Pages)

FIG. 3A
FIG. 3B
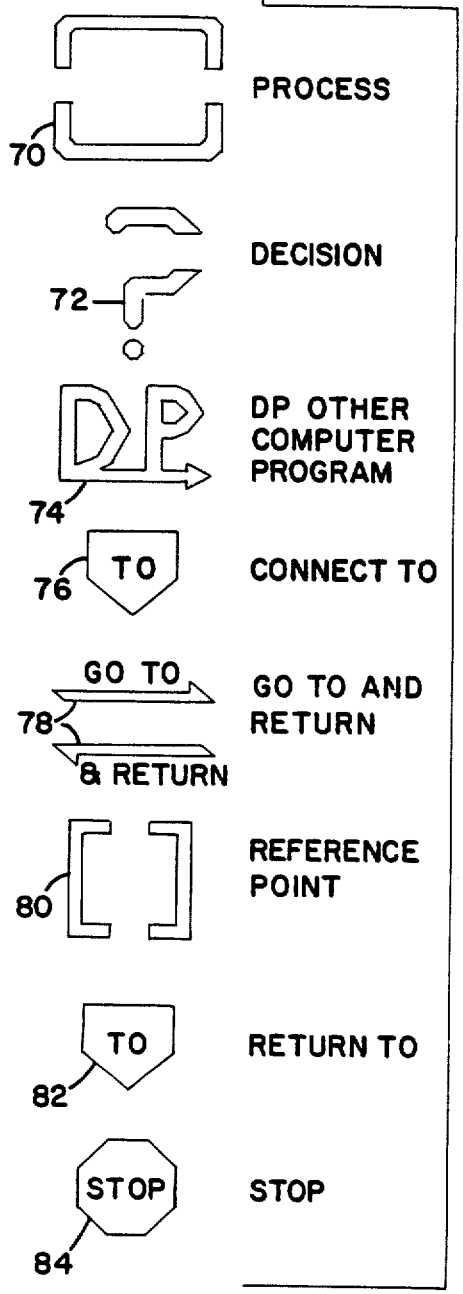
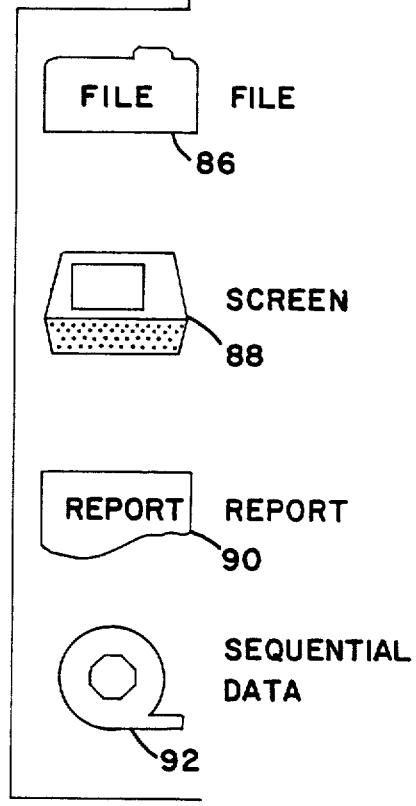

FIG. 5

| ELEMENT NAME | TYPE | LENGTH | DECIMAL | REFERENCE P/S (AND REFERENCE LEVEL IF NECESSARY) |
|---|---|---|---|---|
| 1 COMMODITY CODE | A | 2 | | P |
| 2 EXCHANGE RATE | N | 5 | 2 | |
| 3 EXCHANGE TIME | T | 4 | | |
| 4 EXCHANGE DATE | D | 6 | | |
| 5 | | | | |
| 6 | | | | |
| 7 | | | | |
| 8 | | | | |
| 9 | | | | |
| 10 | | | | |
| 11 | | | | |
| 12 | | | | |
| 13 | | | | |
| 14 | | | | |
| 15 | | | | |

FIG. 6

```
   GOLD EXCHANGE MENU

1. CONVERT DOLLARS TO OUNCES
   2. CONVERT OUNCES TO DOLLARS
   3. STOP THE APPLICATION

SELECT THE DESIRED ACTION BY NUMBER =
   ENTER THE AMOUNT TO BE EXCHANGED
```

FIG. 7

ROW | COLUMN | NAME OF ELEMENT ASSOCIATED WITH THIS FIELD
17 | 4,4 | ACTION
LENGTH: 1  UNDERSCORES: 1
SOURCE: TEMPORARY
TYPE:
EDIT/VALIDATION CRITERIA: REQUIRED ENTRY
DECIMAL: —  FLOW: COLLECT

ROW | COLUMN | NAME OF ELEMENT ASSOCIATED WITH THIS FIELD
18 | 4,4 | AMOUNT
LENGTH: 7  UNDERSCORES: 8
SOURCE: TEMPORARY
TYPE: N
EDIT/VALIDATION CRITERIA: N/A
DECIMAL: 3  FLOW: COLLECT

ROW | COLUMN | NAME OF ELEMENT ASSOCIATED WITH THIS FIELD
    |        |
LENGTH:     DECIMAL:
SOURCE:
TYPE:
EDIT/VALIDATION CRITERIA:

FIG. 8A

| COMMENTS | LAYOUT |
|---|---|
| 1. <u>START</u>--used to initialize elements. Set COMMODITY CODE = GL<br><br>2. <u>SELECT</u>--allows you to select the ACTION and enter the AMOUNT to be exchanged.<br><br>3. <u>STOP OR RUN</u>--If ACTION selected is "3" or the AMOUNT equals zero, stop the application.<br><br>4. <u>RATE</u>--go to GET RATE and return with the EXCHANGE RATE.<br><br>5. <u>OPTIONS</u>--if ACTION = "1", connect to the DOLLARS TO OUNCES path.<br><br>6. <u>OUNCES TO DOLLARS</u>--sets values for the RESULTS screen.<br><br>MESSAGE = CONVERT OUNCES TO DOLLARS<br><br>OUNCES = AMOUNT<br><br>DOLLARS = OUNCES * EXCHANGE RATE<br><br>Display the RESULTS screen<br><br>Connect back to the symbol named SELECT | 1 START<br>↓<br>MENU → 2 SELECT<br>↓<br>3 STOP OR RUN → STOP<br>↓ c<br>4 RATE  GO TO / GET RATE AND RETURN<br>↓<br>5 OPTIONS → TO DOLLARS TO OUNCES<br>↓ o<br>6 OUNCES TO DOLLARS ← RESULTS<br>↓<br>TO SELECT |

FIG. 8B

| COMMENTS | LAYOUT |
|---|---|
| 7. <u>DOLLARS TO OUNCES</u>--Set values for RESULTS screen.<br><br>MESSAGE = CONVERT DOLLARS TO OUNCES<br><br>DOLLARS = AMOUNT<br><br>OUNCES = DOLLARS/EXCHANGE RATE<br><br>Display the RESULTS screen.<br><br>Connect back to the symbol named SELECT. | TO ↓<br>DOLLARS TO OUNCES (7)  ← RESULTS<br>↓<br>TO<br>SELECT |
| 8. <u>GET RATE</u>: Reads the COMMODITIES file and gets the EXCHANGE RATE for Gold plus the associated information. | GO TO<br>GET RATE AND RETURN<br>↓<br>GET RATE (8) ← COMMODITIES<br>↓<br>RETURN |

FIG. 9

OUTPUT NAME  RESULTS

| ELEMENT NAME | PROCESS DERIVED | DETAIL DESCRIPTION |
|---|---|---|
| 1. MESSAGE | OUNCES TO DOLLARS | Constant value equals "CONVERT OUNCES TO DOLLARS" |
|  | DOLLARS TO OUNCES | Constant value equals "CONVERT DOLLARS TO OUNCES" |
| 2. OUNCES | OUNCES TO DOLLARS | Equal to AMOUNT (input on MENU screen) |
|  | DOLLARS TO OUNCES | An arithmetic statement: AMOUNT/EXCHANGE RATE |
| 3. DOLLARS | OUNCES TO DOLLARS | An arithmetic statement: AMOUNT*EXCHANGE RATE |
|  | DOLLARS TO OUNCES | Equal to AMOUNT (input on MENU screen) |

FIG. 12

```
                GOLD EXCHANGE MENU
                    1. Convert dollars to ounces.
                    2. Convert ounces to dollars.
                    3. Stop the application.
            Select desired action by number (1-3):?
            Enter the amount to be exchanged. _ _ _ _ _ _ _ _

Element Name: ACTION           From Screen: MENU
Type: N  Length: 1

Entry required? Y    Fill field?    Y    Automatic tabs?  Y    Minus sign?  N
Default?        N    Secure field?  N    Format Field?    N Valid responses are: Y (User must make an entry); N (User is allowed
    to leave field blank or to accept a default response).
Press EXECUTE when all attributes are defined satisfactorily.
        MENU          COLLECT         This is page 1 of 1.
```

FIG. 13

```
APPLICATION NAME: GOLD EXCHANGE                        STATUS: NEW
PHASE: REPORT DEF'N   REPORT NAME: SAMPLE REPORT    MODE: ADD

Line type: R      Line No.: 3      Column No.: 10      Element type: V

Element Name: EXCHANGE RATE           File Name: COMMODITIES FILE
Type: N     Length: 5     Decimal place: 2

Use S sign? N        Insert commas? N        Display leading zeros? N
Minus sign? N        CR/DR sign? N       Fill with asterisks? N    Format? N Valid responses are: N (no); FI (fixed position); FL (floating).

Press RETURN to accept the default response.
```

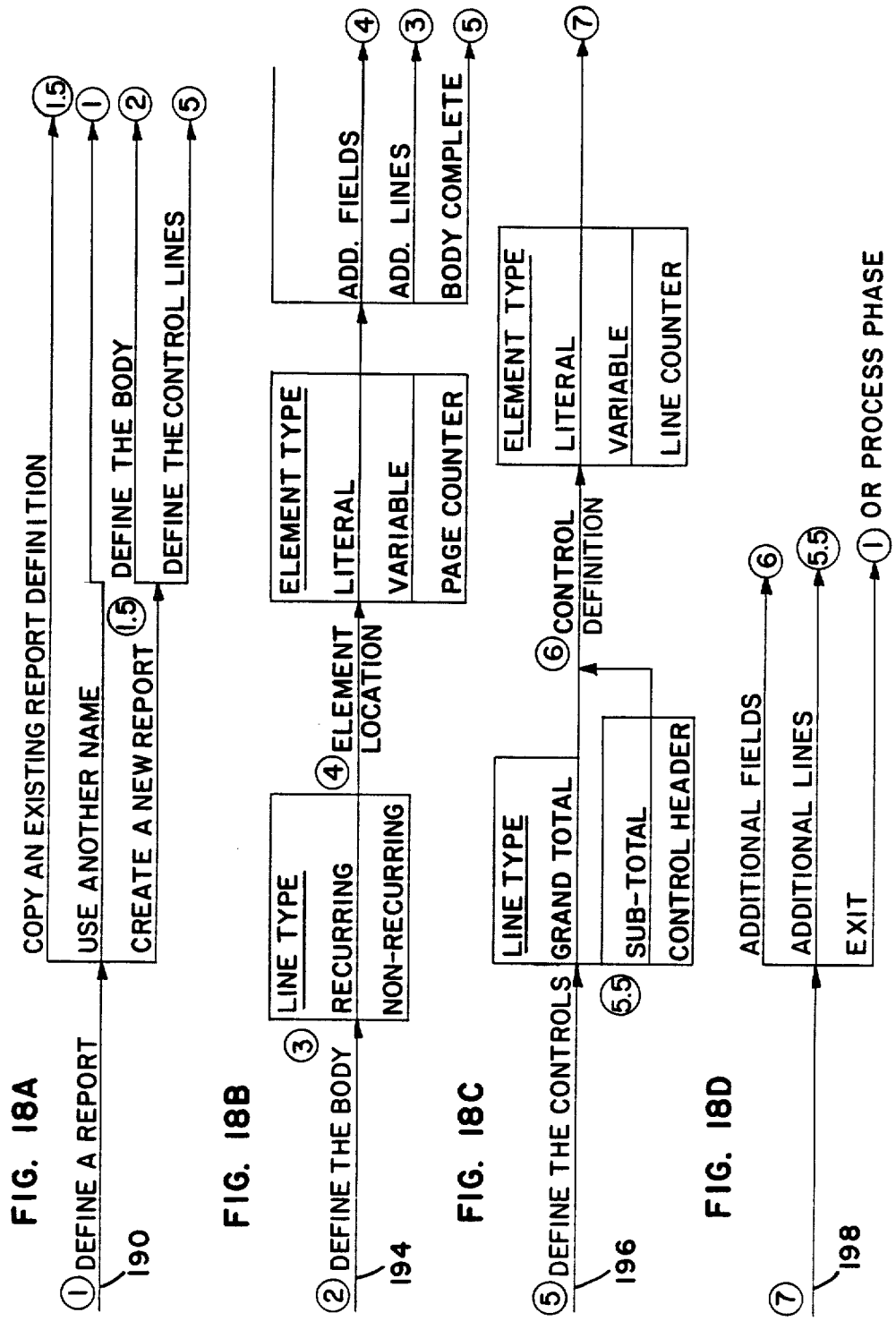

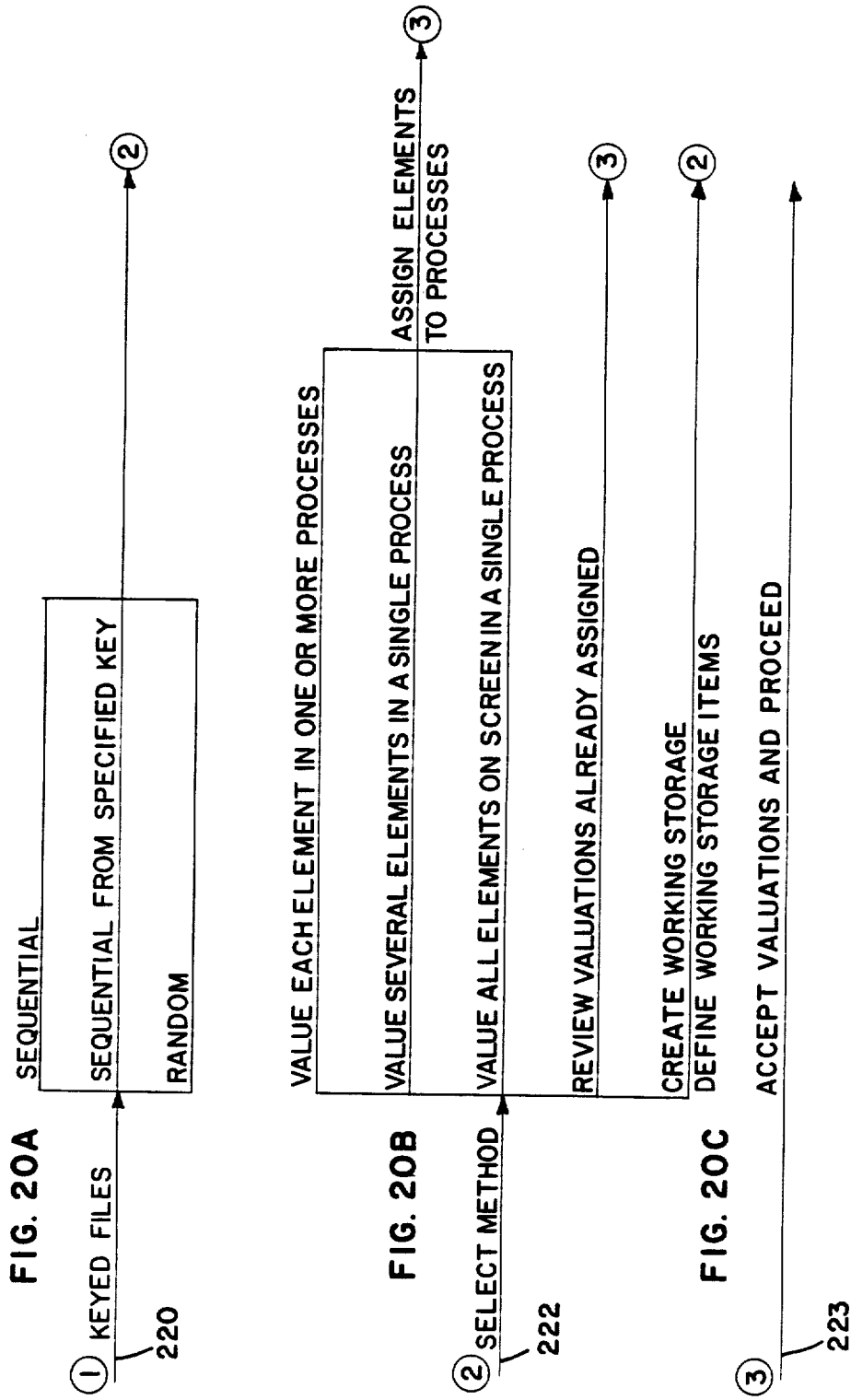

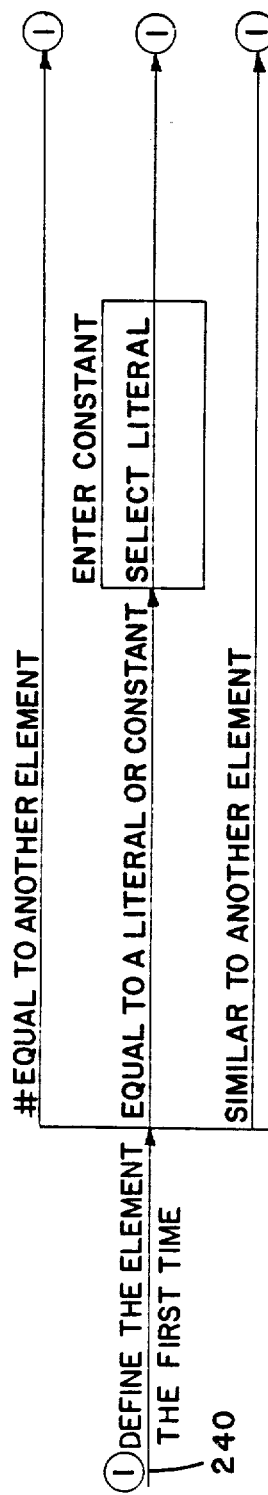
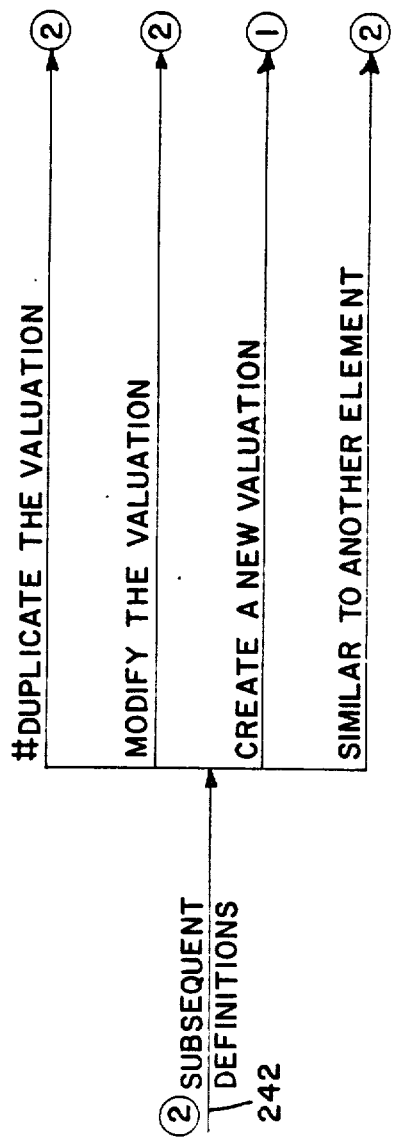
FIG. 22A
FIG. 22B

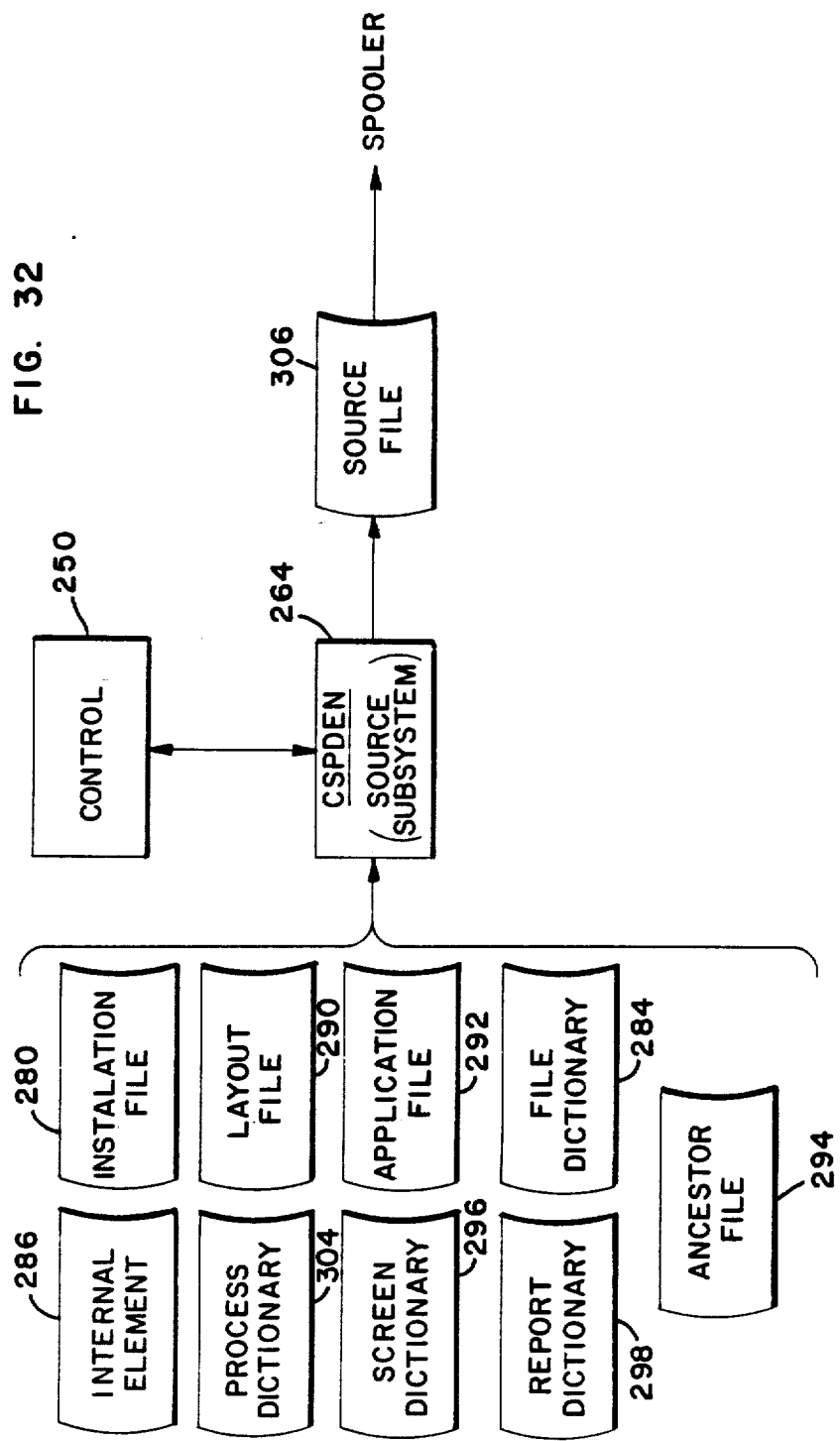

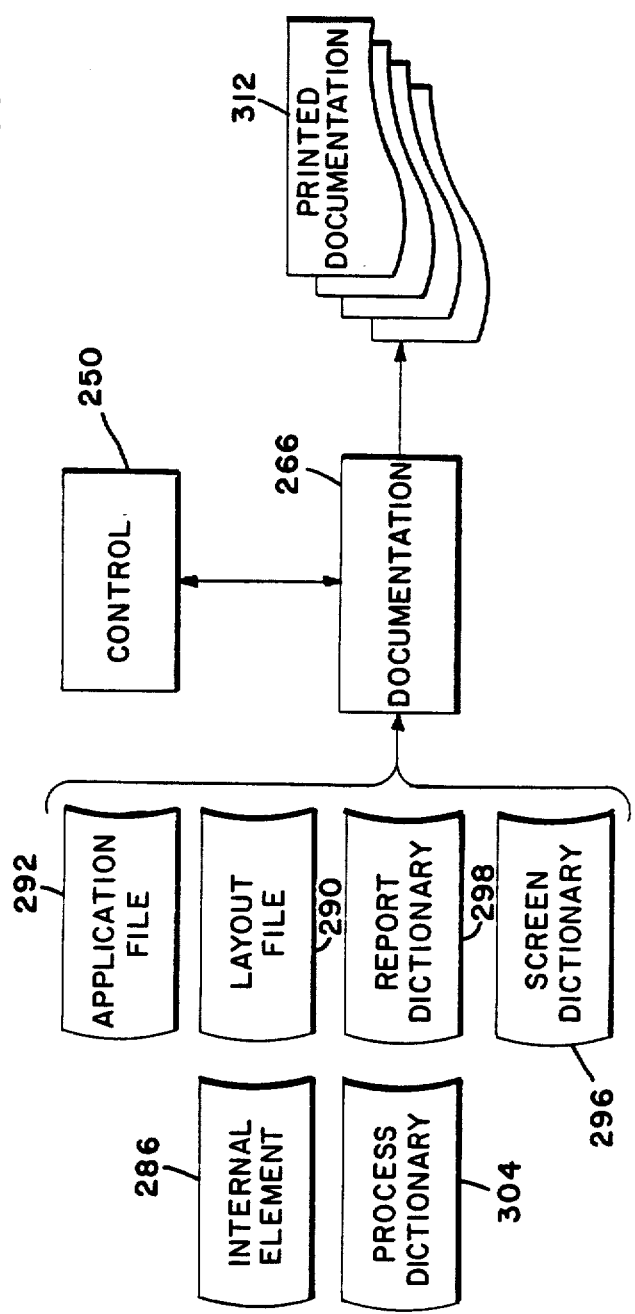

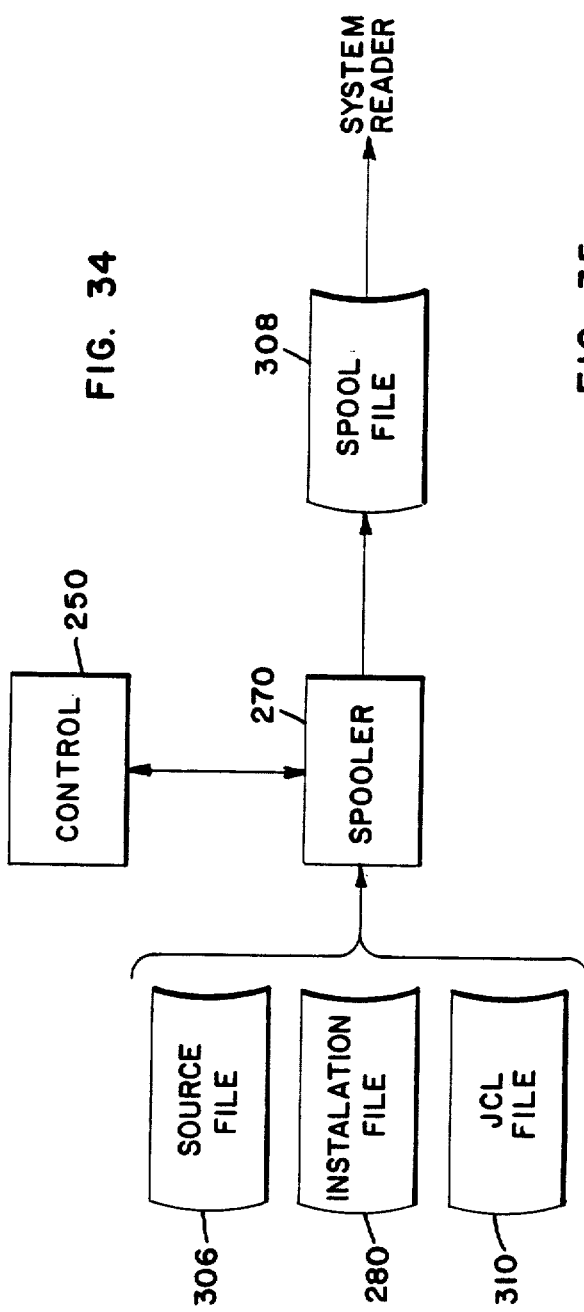
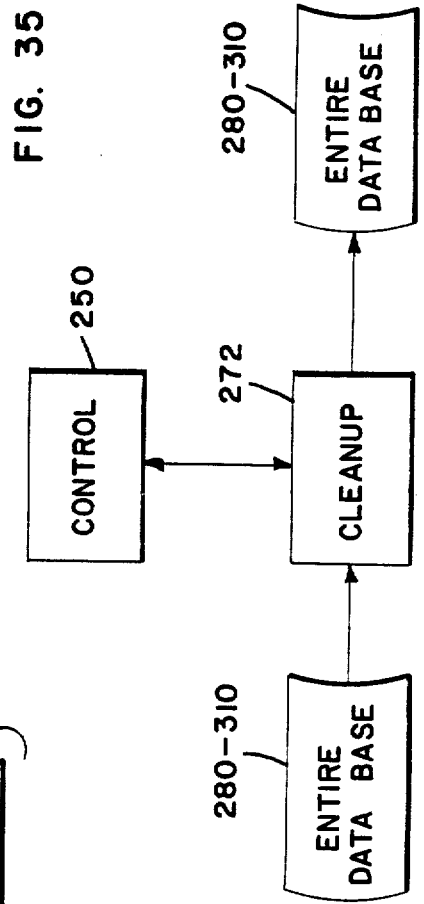

AUTOMATED PROGRAMMING SYSTEM FOR MACHINE CREATION OF APPLICATIONS PROGRAM SOURCE CODE FROM NON-PROCEDURAL TERMINAL INPUT

This is a continuation of application Ser. No. 607,238, filed May 4, 1984, now abandoned.

MICROFICHE APPENDIX CROSS-REFERENCE

The microfiche appendix of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to an automated application program development system and method. More particularly, the present invention relates to an automated application program development system and method which enables automated development of complete operational COBOL programs for stand alone applications or subroutines.

Most application programming is left to management information systems (MIS) personnel. However, typical MIS personnel do not have a good understanding of the application needs of the end user. Some studies have shown that the vast amount of effort spent debugging an application in a typical MIS department is related to errors which were introduced during the requirements specification process. A lesser amount of time is spent on bugs introduced during the detailed design while an even lesser amount is spent on bugs created in the coding phase. Merely increasing the user's up front involvement and spending more time on traditional design will not facilitate application program development. Further, programmer productivity can only be increased up to a certain point. Simply helping talented programmers to write code faster does not address the overall application program development problem, but rather only serves as a stop gap measure.

Many programmer productivity tools have been developed and are currently on the market. The limitations include the fact that you have to have a person skilled in programming and programming language to utilize them. In addition, they are implemented rather late in the application program development cycle and only do a partial job. Many of these programmer productivity tools facilitate programmer design reports and screens, and even produce modules of code, but these various pieces of productivity still have to be knitted together by a programmer to create an operational application program. Furthermore, these programmer productivity tools are not very flexible. If the application does not meet the user's requirements, there is considerable time and expense required to modify and recode it.

At the other end of the spectrum are pure design tools or methodologies. They may provide a graphic representation of logic flow, and the relationship of modules within a system design, but they do not produce code and they do not give an end user an operating application program.

The key to improving efficiency in the application program development process and one which current development tools do not provide, is to improve the efficiency of the communication process between the people who are going to use the system and the people who are going to build it. In the application development continuum, the user and analyst have to be able to clearly communicate and understand exactly what the application is supposed to produce and how it will flow logically to produce those results during the functional specification stage of the development.

During the detailed design and coding and checkout stages which are very technical and overwhelming to the end user, the end user will frequently lose contact with the overall development process. They then do not become involved again until the testing stage to determine whether the application program performs to their expectations. If it does not, the design must be revised and the code rewritten which is very time consuming and expensive.

The present invention solves many of the problems of conventional programmer productivity tools.

SUMMARY OF THE INVENTION

The present invention is particularly advantageous in that it automates the time consuming and expensive steps of detailed design and coding and allows the analyst and end user to develop operating prototypes, then test and modify those prototypes until they meet the user requirements.

The present invention can be used by MIS personnel to develop application programs that precisely meet user requirements in less time than conventional programming methods.

Additionally, the present invention is particularly advantageous because the user is not required to learn a special programming language. The present invention prompts the user to provide the information necessary to design a complete application.

The present invention addresses the total application program development process, not just isolated portions thereof. Communication between MIS personnel and the end user is improved as the present invention utilizes a dialogue which the end user understands and is not overly technical. In the preferred embodiment, the present invention will have at least a couple of different dialogue levels so as to facilitate use by the analyst and by the end user.

Yet another feature of the present invention is that it provides for operational source code development.

In addition, the present invention provides for automated documentation.

The present invention is particularly helpful in that it checks for errors in user logic and enables modification at any time.

Furthermore, one embodiment of the present invention has several built in default conditions such that in many cases the user can rapidly step through a sequence of events in the course of program development.

Yet another feature of the present invention is that it enables a user to browse through various aspects of the program development.

The preferred embodiment of the present invention takes the user through five phases of development. In the layout phase, the user utilizes graphics to paint a picture of the task/program description or logic flow. This is particularly advantageous because both the user and the analyst can review and agree on the logic flow of the application task or program. The file, screen and report phases allow the user to create or use existing input and output structures. Finally, in the process phase, the user answers a series of questions to complete the detailed design. From the information provided in these five phases, the present invention then automatically produces the COBOL source code, program documentation, and much of the job control language.

A particularly advantageous feature of the present invention is that true prototyping is an economic reality. The particular application program can be tested with the user's own data. If the prototype does not satisfy the user's exact requirements, it can be quickly and readily changed by use of the editor functions provided by the present invention.

These and various other apparatus and features of novelty which characterize the present invention are pointed out with particularity in the claims annexed hereto and forming a part hereof. However, for a better understanding of the invention, its advantages, and objects obtained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals indicate corresponding parts through the several views:

FIGS. 3A-B illustrate the symbols utilized in one embodiment of the present invention during the layout phase;

FIG. 5 illustrates a sample file definition worksheet;

FIG. 6 illustrates a sample screen definition worksheet;

FIG. 7 illustrates a sample definition worksheet of elements appearing on the screen shown in FIG. 6;

FIGS. 8A-B illustrate a worksheet of the layout shown in FIGS. 4A-B with comments attached;

FIG. 9 illustrates a sample general planning worksheet documenting details for a given output such as the screen definition shown in FIG. 6;

FIG. 12 illustrates a sample display presentation during the screen definition phase;

FIG. 13 illustrates a sample display presentation during the report phase;

FIGS. 18A-D are a diagrammatic representation of an embodiment of the report definition phase;

FIGS. 20A-C are a diagrammatic representation of an embodiment of the Where to Derive step of the process phase;

FIGS. 22A-B are a diagrammatic representation of the logic flow of the how to derive elements portion of the process phase;

FIG. 32 is a block diagram of an embodiment of the source subsystem;

FIG. 33 is a block diagram of an embodiment of the documentation subsystem;

FIG. 34 is a block diagram of an embodiment of the spooling subsystem; and

FIG. 35 is a block diagram of an embodiment of the clean-up subsystem.

DETAILED DESCRIPTION OF THE PREFERRED EMBODIMENT

Figure 1:
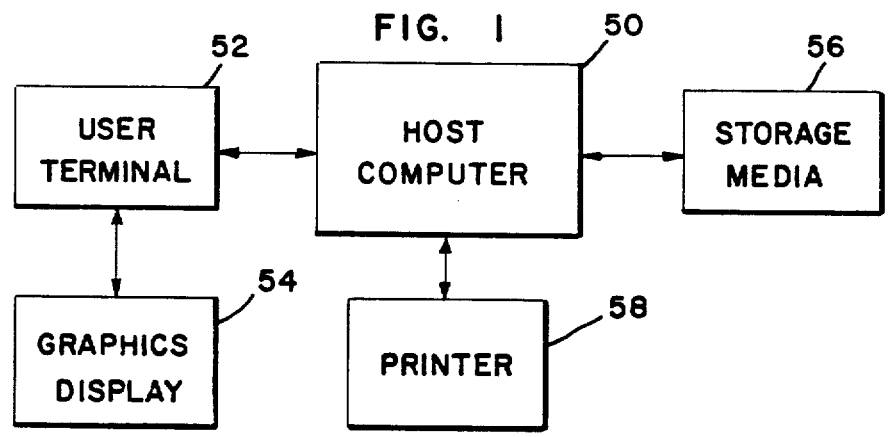
FIG. 1 is a simplified block diagram illustrating an operational environment of the present invention.
Figure 2:
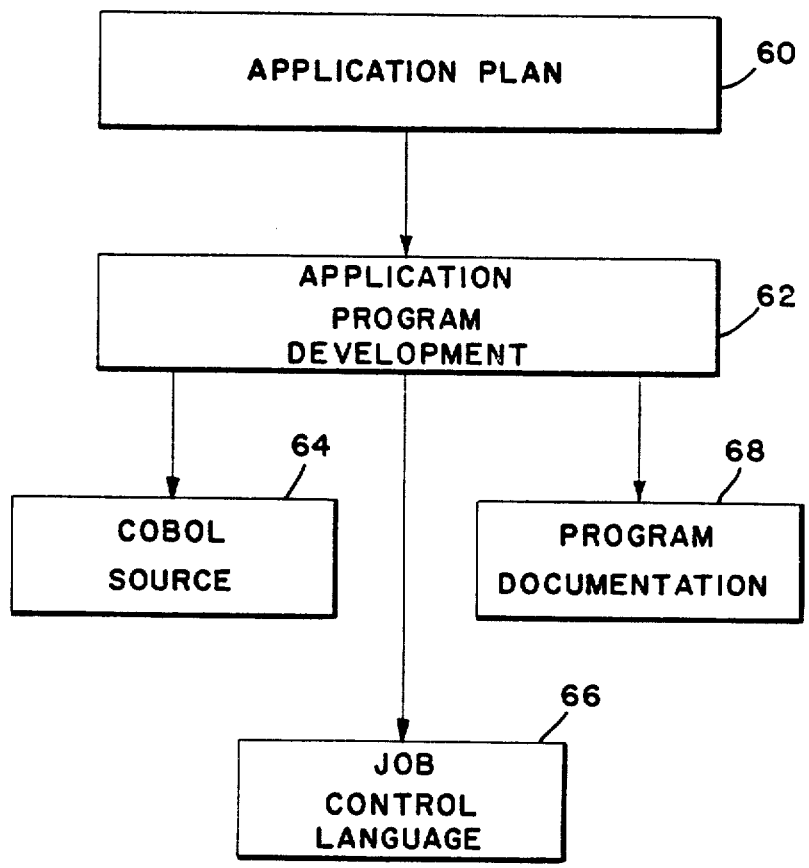
FIG. 2 is a simplified block diagram of the functions of an embodiment of the present invention.

Referring now to the drawings, there is illustrated a preferred embodiment of the present invention. FIG. 1 is a block diagram illustrating a typical operational environment of the present invention. The present invention includes a digital program which is resident in a host computer 50. The user interacts with the digital program in the host computer 50 by use of a user terminal 52 for input to and output from the host computer 50. In the preferred embodiment, a graphics display 54 will be utilized to display menues and various graphic symbols or icons. The host computer 50 in turn is suitably connected to various peripherals such as storage media 56 for file access and a printer 58 for report outputs. As illustrated in FIG. 2, the user will typically develop an overall application plan as generally designated by the block 60. The user will then take this plan and implement it at the user terminal 52 as designated by the block 62 and thereby develop COBOL source 64, job control language 66, and/or program documentation 68 as required.

When developing an application program using the application development system and method of the present invention, the user will progress through five major steps and substeps as listed below:

1. LAYOUT PHASE
   Symbol Selection

Layout Modification
Layout Validation
2. FILE DEFINITION PHASE
   File Format
   File Reference
   File Modify Permissions
3. SCREEN DEFINITION PHASE
   Screen Format
   Screen Field Definition
4. REPORT DEFINITION PHASE
   Report Form Selection
   Body of Report
   Control of Report
5. PROCESS PHASE
   Decision Paths
   WHERE to Derive Elements
   Data IN/OUT Directives
   HOW to Derive Elements
   Exception Processing In the layout phase, the user uses the graphics capability of the graphics display 54 to name and identify the processing functions and decisions associated with the application. The user will further define all input and output associated with the application. The final layout structure will serve as a logic flow road map for the remainder of the application development. The layout structure is built by selecting and naming one icon or symbol at a time. The automated system will build the path vertically as the user adds symbols, one path at a time, until all paths logically end. After building an initial layout or during the course thereof, the system allows the user to add, change, or delete symbols. Much of the layout phase, as are the remaining phases, is menu driven such that the user is presented with options to select from. The system will automatically review the user's logic layout and via error messages and warnings inform the user if there are any errors in the logic flow. The user is then provided an opportunity to correct such errors.

The layout phase is a graphic way of outlining in detail the logic flow of the application program as it is defined in the functional specification, each function being associated with a symbol and each symbol being named.

Illustrated in FIGS. 3A-B are the symbols associated with various program functions and the input and/or output functions which may be associated with the process symbol. The process symbol 70 represents a position in the application where data can be collected or displayed or any data manipulation can be performed. The decision symbol 72 represents a point at which the application will follow one of two alternative paths. The data processing symbol 74 represents a point at which a coded function that already exists is referenced. It may be external source statements, a subroutine, or an external table that already exists. The connect to symbol 76 represents a connection between two paths of the application or a connection within the same path and is representative of a COBOL GO TO statement. The go to and return symbol 78 is used with a reference point and represents a point in the logic flow at which the user wishes to leave the current path, go to another path, perform specified activities, and return to the next step in the current path. This symbol is representative of a COBOL PERFORM. The reference point symbol 80 is a marker in the logic path used to reference where the go to and return or data processing symbols 78 and 74 are located. The return to symbol 82 designates the completion of the other path when a go to and return path is entered. It returns the logic flow to the next step after the reference point or decision symbol. The stop symbol 84 indicates an exit from the application. Every application must include at least one stop signal. This symbol is representative of a COBOL STOP RUN or PROGRAM EXIT. The file symbol 86 in FIG. 3b represents the reading and writing of an organized collection of related data stored in index or direct access form. The screen symbol 88 represents a terminal display necessary to collect or display data. It requires a human interface via a CRT terminal or the like. The report symbol 90 indicates the point at which reports will be generated within an application. The sequential data symbol 92 represents the reading and writing of information stored in sequential format such as tapes, sequential files, etc. Accordingly, the logic flow is represented by one of the four primary function icon or symbols (70, 72, 74, 78), three termination icons (76, 82, 84), and four I/O icons (86, 88, 90, 92).

As a result of the layout phase, each symbol will become the building blocks of the resulting COBOL program. For example, the process symbol names will become the COBOL paragraph names. Names of files, screens and reports become the COBOL file description names. The details are not yet defined, but the basic logic flow is defined. The general layout information is utilized by the system to prompt the user in the remaining phases. The information subsequently gathered in the remaining phases will add the necessary detail to the basic program application structure defined in the layout phase so as to enable an operational COBOL program to be developed.

In the file definition phase, the user defines the data files involved with the application, the organization of the data within the files, and how this data will be referenced. Each is named and its attributes (type, length, and decimal positions) identified. The elements which form the primary key or reference are sequenced as well as the elements which form each secondary key or reference. File definitions are shared by all application programs created on the system. However only the files's creator is permitted to modify unless other user names are specified. It is also used to define the data processing symbol 74 arguments. As a result of the file definition phase, all the detailed information needed to construct the file definition for each file in the application program is provided. The elements in each file become part of the data dictionary for the application program. The file name becomes universally known to all program applications developed.

In the screen definition phase, the visual format of each screen or display presentation is planned, plus its input and output characteristics, and the sources of the data to be used. Underscores are entered for each element on the screen that the application will collect or display. The underscored elements are named and their attributes (type, length, and decimal positions) identified. Any validation or layout requirements for input elements are specified. The screen definition elements become part of the data dictionary for use by the application program. The elements named on the screen or display presentation are identified as part of the COBOL screen section. The automated system of the present invention will record any relationships for those screen elements which have the same name as other elements in the data dictionary for the particular application being developed. These elements will automatically be valued or derived by the system in the process phase.

In the report definition phase, the visual format and the sources of data for the hard copy reports included in the program application will be defined. The user is allowed to choose the appropriate form from those predefined in the installation file. For each line of the report, the user specifies the line type as reoccurring or nonreoccurring. The elements contained on each line are defined by specifying the starting column, element type (variable or literal), and the element's name and attributes. Each control line type is defined as a control header, subtotal or grand total, and the control sequence (major to minor). The elements which are contained on each line are defined by specifying the starting column, element type (variable or literal) and the element's name and attributes. The report elements will become part of the data dictionary for the program application. The elements named in the report will become part of COBOL's working storage section. Any relationships for those report elements that have the same name as other elements in the data dictionary will be recorded and will automatically be valued or derived by the system in the process phase, that is a COBOL move statement will be generated.

In the process phase, the detailed information required to build the procedure divisions of the COBOL application program which will accomplish the functions defined in the layout phase will be gathered. The system will ask questions based on the layout and provide options so that the activities which must be performed by the application program can be readily defined. The process phase inverts the overall layout logic and creates logical paths to each output symbol. Accordingly, the process phase defines how each element in the output is valued or derived.

The preferred embodiment of the process phase will be divided into five major steps:

1. Path Decisions
2. Where to Derive Elements
3. Data In/Out Directives
4. How to Derive Elements
5. Exception Processing In the Path Decisions step, the system will sequence through the layout to each decision symbol and ask the user to define the criteria for taking either the horizontal or vertical path so that the system is obtaining information to generate a COBOL IF statement.

In the Where to Derive Elements step, the system will sequence to each process symbol with an attached file symbol and ask which key (primary or secondary) will be used and the method of processing (sequentially or randomly, etc.) so that the system knows that elements of the specified key must be valued and how to open and close files.

Also in the Where to Derive Elements step for each output symbol found in the layout, the system will ask the user to assign each element associated with that output symbol to a process symbol so that the system knows in which process symbol the output elements are valued and the sequence of these process symbols by logical path. In addition, the system enables the user to create elements needed temporarily to value and output element whereby the system will recognize that it must define a working storage element. In the Data In/Out Directives step for each process symbol having multiple inputs, the system will ask the user to sequence the multiple input. Otherwise, for each process symbol, the system assumes a sequence of input directives, data manipulation (valuation or derivation), then output directives. In addition, if a process symbol has a screen which is both input and output the system will ask the user to sequence the input and output. If a file is to be output randomly in one process symbol, the system will as the operator if this is to write, rewrite or delete a record on that file. The results of these questions enables the system to determine the order of the input and output directives for each process symbol. In the How to Derive Elements step for each element assigned to a process symbol, the system asks a series of questions as to how the element is to be valued which aids the system in determining the type of COBOL statement needed to value the element (e.g., compute, move, etc.) and the specific details needed for each statement. Importantly, the system is determining the order of the valuing of each element within the process symbol. In the exception processing step, the system allows the operator to skip some or all activities in one process symbol whereby the system generated an if statement according to the conditions and activities specified. Furthermore, a review of all the activities (derivations and directives) for each process symbol is provided.

APPLICATION DEVELOPMENT PROCESS

Described hereafter is an embodiment of an application program development process in accordance with the principles of the present invention. The present invention is not intended to be limited to the specific features and details of process.

Figure 4A:
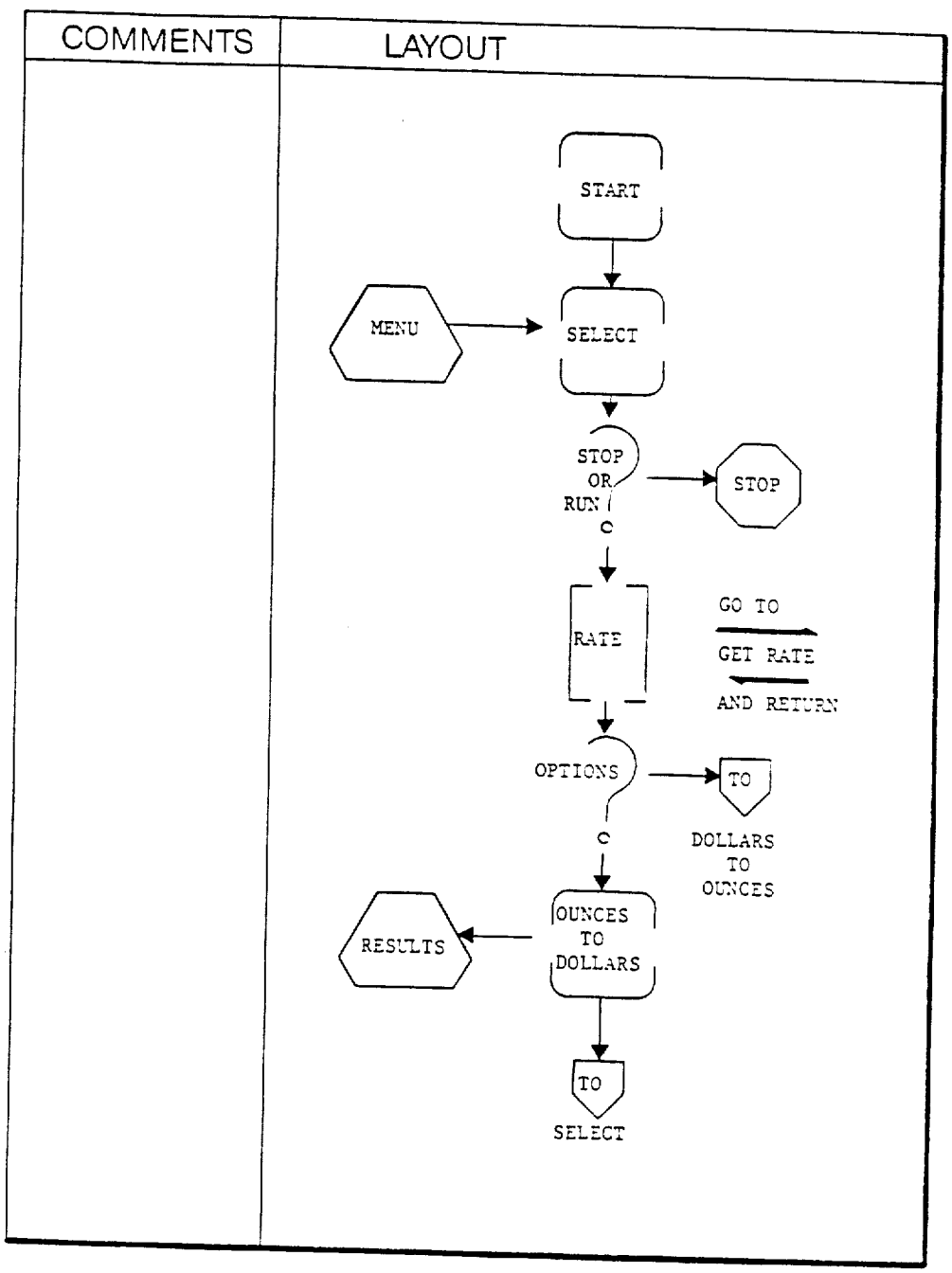
FIGS. 4A-B illustrate a sample layout worksheet.
Figure 4B:
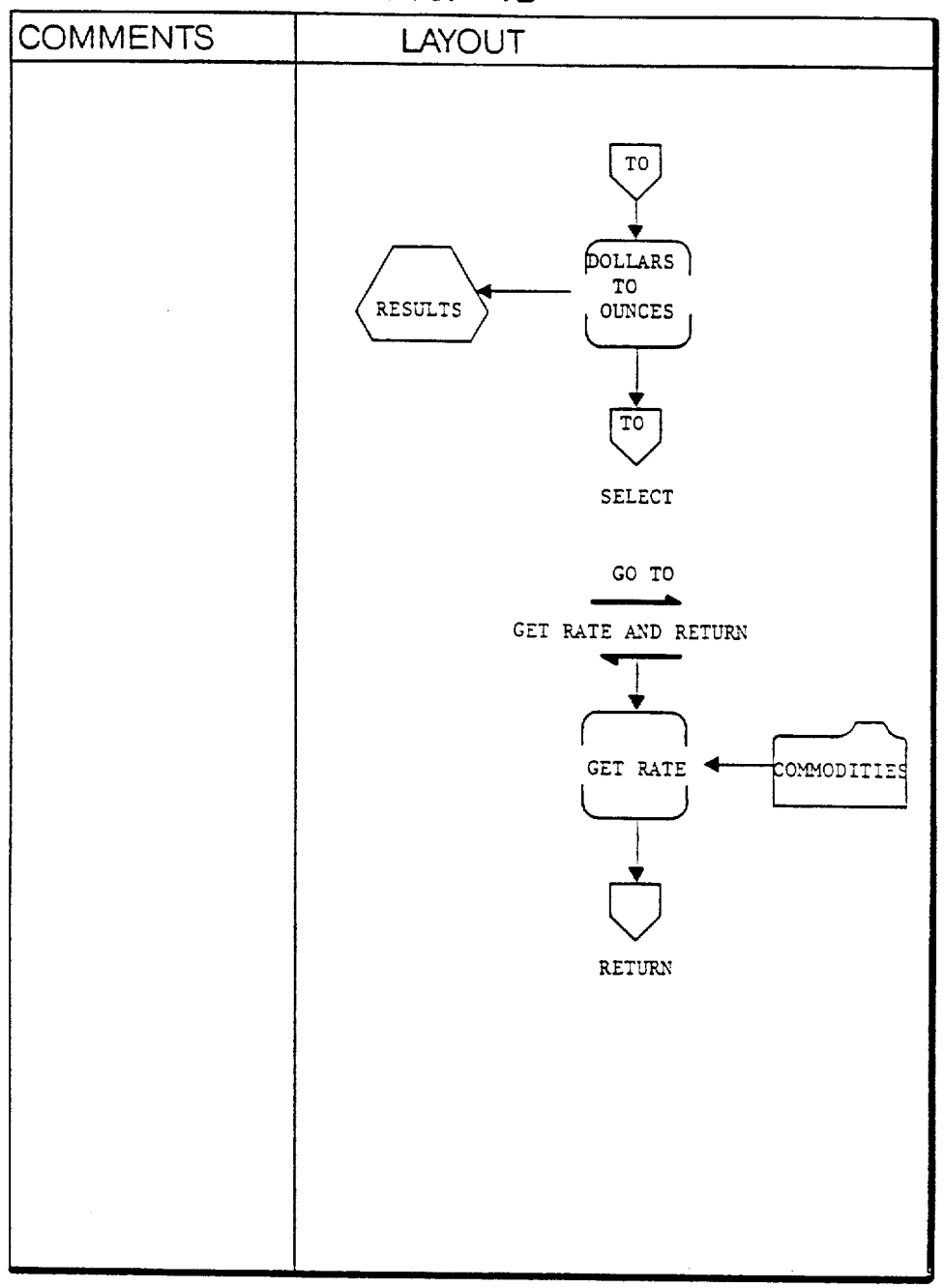

Typically, the user will begin the application development process with a series of planning steps. The overall purpose, objectives, and requirements and basic functions to be performed by the application are defined. Once the user has completed the general planning of the application, the layout phase symbols are arranged on a worksheet in their logical sequence for the application program. For example, illustrated in FIGS. 4A-B are sample layout worksheets for a gold exchange application program which calculates the total number of ounces of gold that can be purchased for a specified dollar amount, calculates the total number of dollars involved if a specified number of ounces of gold is sold, and displays the results of the requested calculation. Illustrated in FIG. 5 is a file definition worksheet for the file commodities of the example shown in FIGS. 4A-B. The file commodities contains the commodity exchange information including the commodity code, the exchange rate, the exchange time, and the exchange date. As illustrated in the file definition worksheet, the commodity code is utilized as the primary reference to the file. Illustrated in FIG. 6 is a screen definition worksheet wherein the menu screen or display presentation is documented. The underscores illustrated on the screen definition worksheet represent the collection of data (input) or the display of data (output) in the application. As shown in the element definition worksheet of FIG. 7, each of these elements or underscored fields are named and defined so that they may be referred to in the process phase of the application program development. The first underscore on the screen definition worksheet refers to the element Action and the second set of underscores refers to the element named Amount. Action relates to the user's selection of option 1, 2, or 3 shown on the screen worksheet and Amount relates to the value entered, either dollars or ounces. It will be appreciated that a separate screen definition worksheet should be defined for each display presentation. In the example shown in FIGS. 4A-B, there are three such presentations, two of them representing output and one representing input. Although not shown in the example illustrated, if there were a report generated by the application program, a report definition worksheet and corresponding element definition worksheet would be developed.

Typically, after the user has finished planning the layout, files, screens and reports, comments should be added to the layout which will help to define the events occurring in each symbol as is generally illustrated in the sample worksheets of FIGS. 8A-B. In addition, a general planning worksheet as illustrated in FIG. 9 may be developed to document the other pertinent details for a given output, such as the results screen or display presentation of the example.

After planning of the application is complete, the user uses the worksheets as a guide and enters the application layout via use of the terminal 52 and graphics display 54. The system will prompt to operator, provide menues and options, and display errors or warning messages on the display throughout the process. Frequently, as illustrated by the sample display presentations of FIGS. 10 and 14, a split screen display will be provided with the logic layout symbology on the right side of the display and user prompts or options on the left side.

The preferred embodiment of the present invention provides a secured system wherein the user must provide a name and password in order to gain access to the system. Once the user has gained access to the system, the following menu of general functions is provided:

1. Work on an application;
2. Define a file;
3. Document a file;
4. Change your user profile;
5. Work on the installation file;
6. Use a utility;
7. Sign off.

Upon designation of one of the above-listed general functions, the user is offered a second menu of options and so forth.

Selecting the work on an application options enables the user to work on a specific application. The user can create a new application or subroutine and define the user names allowed to use the application or subroutine. The user must name the application or the subroutine being created. If a subroutine is being created, the system will prompt the user to name the arguments or data elements being transferred to the subroutine and their flow. Each argument is then treated as a file and the system will prompt the user to define each in the file definition phase. Under the work on application option, the user can modify an existing application by starting in any of the system phases. The system will prompt the user for the phase to begin in. Additionally, the user can delete a previously entered application. If while working on an application the user had terminated application program development via a time out function provided by the present invention, when the system is restarted it will return to the point at which the time out function initiated such that the user is able to finish the application without repeating any steps. If the time out was pressed after completing a particular transaction, the system will go to the next step when it returns to the application program development. If the time out function was initiated during a transaction, after restart, the system will return to the beginning of that transaction. The user also has the option to create any hard copy printouts of all or a part of the documentation provided by the system. Further, the user can permit others to read, change, delete from, or add to the application development. The user is also given the option to list any applications/reports which have been created. Such reports may be listed; for example, by owner and creation date which displays application name, type, access, owner and date created. Or they may be listed by user and last date modified which provides application name, type, access, name who last modified, and last modified date. Also, the system of the present invention enables an entire application to be copied whereby the user can enter the modify mode of the layout phase and modify the copied application.

Under the define a file option, the user will name a file and define whether it is sequential or direct access. A direct access file represented by the file symbol 86 is a collection of data which is an index file or data base. a sequential file represented by the symbol sequential data symbol 92 is a sequential collection of data. If a sequential file is identified, the system will ask the storage medium; tape, cards or disk. The system will then progress to the normal file definition phase.

The document a file option allows the user to print the file documentation without having to find a specific application.

The change user profile enables the user to select either the standard dialog which is intended or for end users, or an abbreviated dialog which is intended for MIS or data processing personnel.

The work on an installation option is reserved for only specified users so as to enable the installation file to be created or modified.

The use a utility option prompts the operator or user as to whether specific application is to be restored or backed up.

The sign off option disconnects the user name and asks for a new user name and password. The system can then be unloaded by initiating a special function key and following normal log off procedures.

Figure 10:
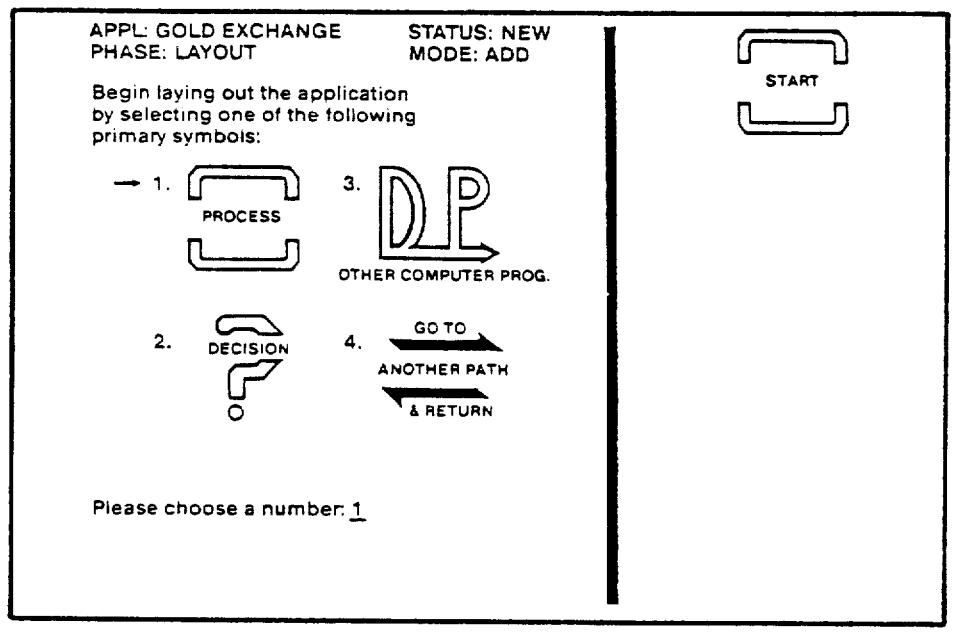
FIG. 10 illustrates a sample display presentation during the layout phase.
Figure 15A:
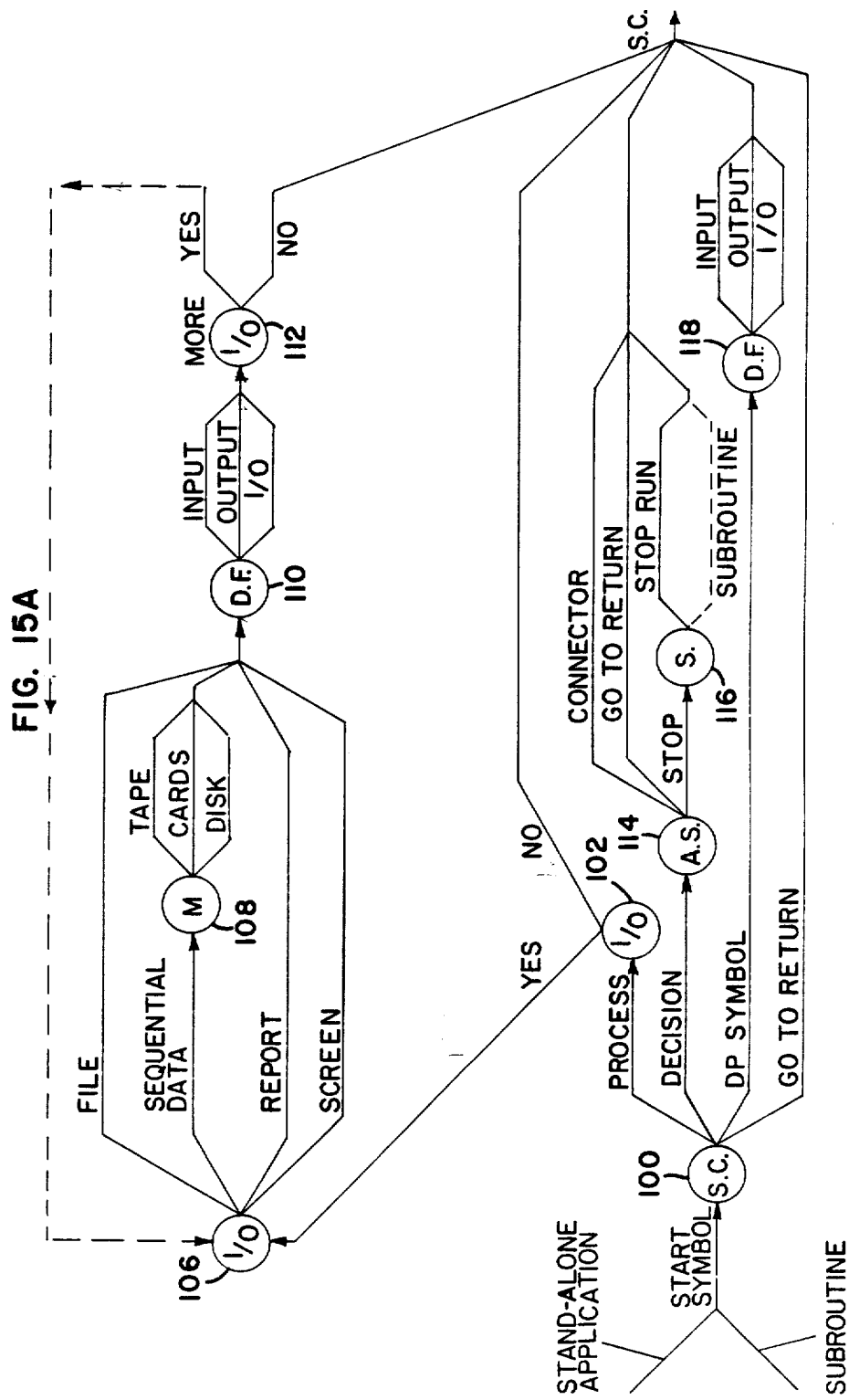
FIGS. 15A-D are a diagrammatic representation of an embodiment of the layout phase.
Figure 15B:
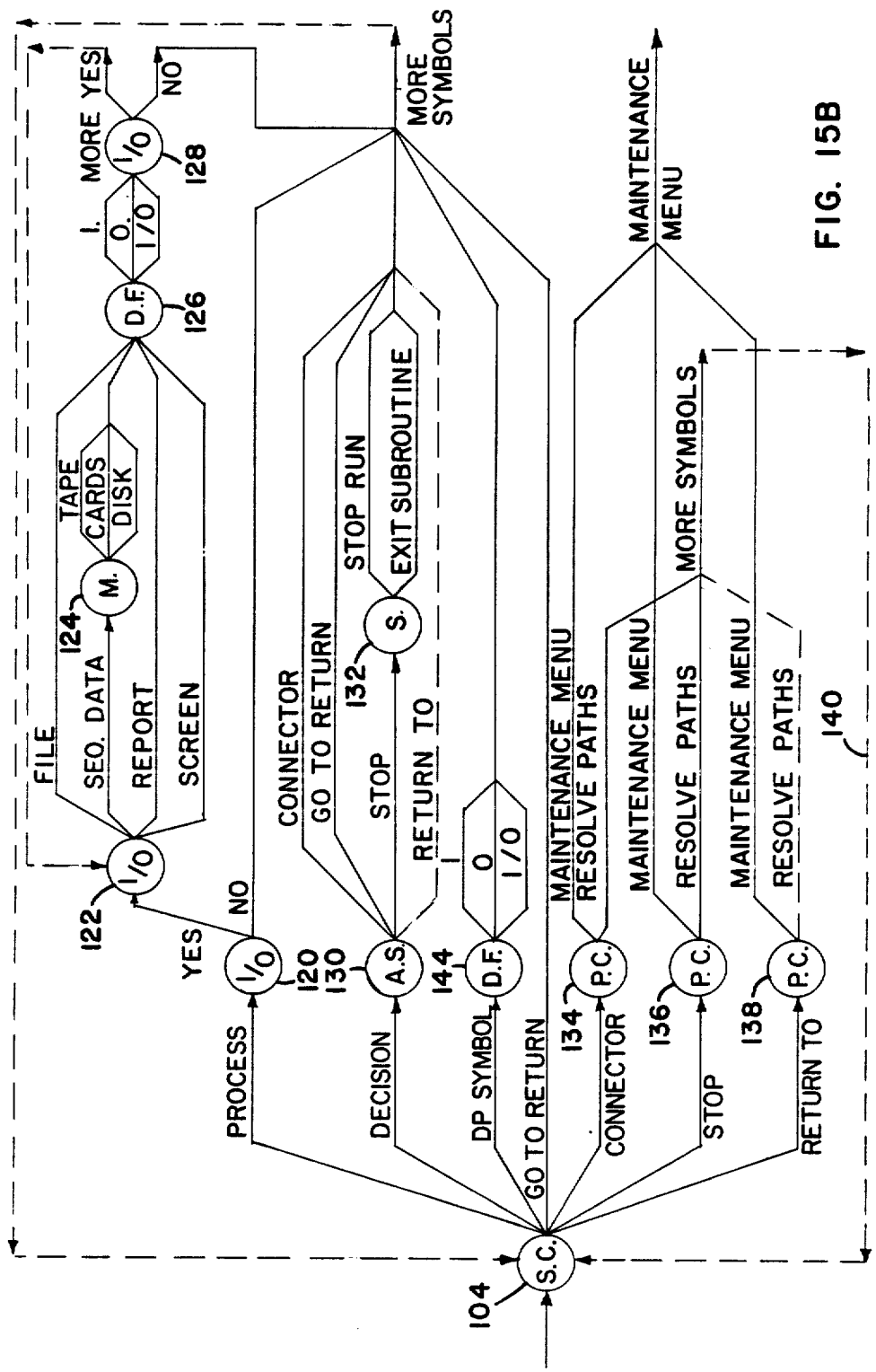

If he user elects to develop a new application or a stand along routine, the user is given the opportunity to define who will have access to the application or subroutine and is further allowed to define the application for documentation purposes. Once this has been accomplished, the system will enter the layout phase wherein the application's general logic flow will be defined. During the layout phase, the user will enter one graphic symbol at a time. Illustrated in FIG. 10 is a screen presentation which appears the graphics display 54 at the beginning of the layout phase. The logic flow of the layout phase is illustrated in FIGS. 15A-D. As illustrated in FIG. 10, the symbol choices and system prompts or queries appear on the left side of the screen whereas the graphics of the application program appear on the right side of the screen, the start symbol being illustrated at the top on the right side of the screen. Once into the layout phase, the system will prompt the user for a symbol choice as illustrated by the connector 100 in FIG. 15A. Initially, the operator will have the choice of selecting the process symbol 70, the decision symbol 72, the DP symbol 74, or the go to and return symbol 78. Upon selection of an appropriate symbol, the user will be asked to name the process and will be given the option to enter a brief description for documentation purposes. At connector 102 as illustrated in FIG. 15A, if the process symbol 70 had been selected, the user is given the option to attach any input and/or output symbol to the process. The process symbol 70 is the only one to which input or output may be attached with up to eight input or output symbols being attached to one process symbol. If no input or output is to be performed at the process symbol, the user is then given the opportunity to select another symbol as indicated by connector 104 in FIG. 15B. If input or output is to be performed, at connector 106 the user is prompted to identify the input or output type. The user may select either the file symbol 86, the screen symbl 88, the report symbol 90, or the sequential data symbol 92 as illustrated in FIG. 3b. After selecting an input/output symbol, the system asks the user to name the symbol. If the sequential data symbol 92 is selected, at connector 108 the user is asked the type of media; tape, cards or disk. As illustrated at connector 110, the system queries the operator as to the data flow of the input/output; that is, is it input, output, or both? The system then asks the user at 112 if more input/output is desired for the process symbol. If so, then as illustrated the system will query the operator as to the nature of the input/output at 106. If there is no more input/output associated with that particular process symbol, then as illustrated at 104 in FIG. 15B, the system will provide the operator with a selection of new symbols.

When any of the symbols are selected, the system asks the user to name a symbol and allows a brief description for documentation purposes.

If the decision symbol 72 is selected, the system asks the operator to attach the connect to symbol 76, the stop symbol 84, or the go to and return symbol 78 as indicated by the connector 114. If the stop symbol 84 is selected, then at 116 the system will query the user as to whether this is a stop run for an application or a subroutine. If the DP symbol 74 is selected, the system will prompt the user for the reference point symbol 80 and ask the user to identify the referenced computer program as one of the following: include external source statements, use a subroutine, or use an existing table. The system will then prompt the user to name the other program. If external source statements or an existing table are selected, the name must be defined in the installation file. If subroutine is selected, the system will inquire as to the arguments or data elements transferred and at 118 will ask for their data flow status; input, output or both. Each argument will then be treated as a file and the elements will be defined in the file definition phase.

Once the initial layout symbol has been chosen, as indicated at 104 the user will have a choice of essentially seven different layout symbols. If the process symbol 70 is chosen then once again the system will query the user at 120 as to whether or not there is any I/O associated with the process. At 122, the user will be queried as to the type of I/O, and if the sequential data symbol 92 is chosen, at 124 the user will be queried as to the type of media. At 126, the user will be queried as to the data flow of the input/output, then asked at 128 whether more input/output is needed. If the decision symbol 72 is chosen, at 130 the user will be queried as to the type of symbol for the horizontal path. If the attached symbol is the stop symbol 84, the user will be queried at 132 as to whether this is a stop run for the stand alone application or an exit for a subroutine. The system will then ask the user whether any more logic symbols are to be included in the vertical path. If the operator selects the go to and return symbol 78, the user will be prompted for the reference point symbol 80 and the name of the first symbol and the other path. If the connect to symbol 76, the stop symbol 84 or the return to symbol 82 are selected, at 134, 136 and 138, respectively, the system will determine whether all logical paths have been resolved. If they have not been resolved, then as indicated by the line 140 the user will be given an opportunity to select another symbol at location 104. If all paths have been resolved then the system will provide the user the opportunity to modify the logical layout of the application program via a maintenance menu as indicated at location 142. As illustrated at 144 if the DP symbol 74 is selected, the user will be asked to identify the arguments and their data flow, input, output, or input/output both. As illustrated at the connector 130, the return to symbol 82 might be attached to the decision symbol 72 if the decision symbol is in a go to and return branch of the logical flow.

When progressing through layout, the system will complete the main vertical logic flow path first. Once that path is finished, the system will ask questions and develop the information required to define any additional paths as specified using the connect to symbols 76 or the go to and return symbol 78. The system will not allow the user to leave the layout phase without at least one of the paths terminated with the stop symbol 84.

Figure 15C:
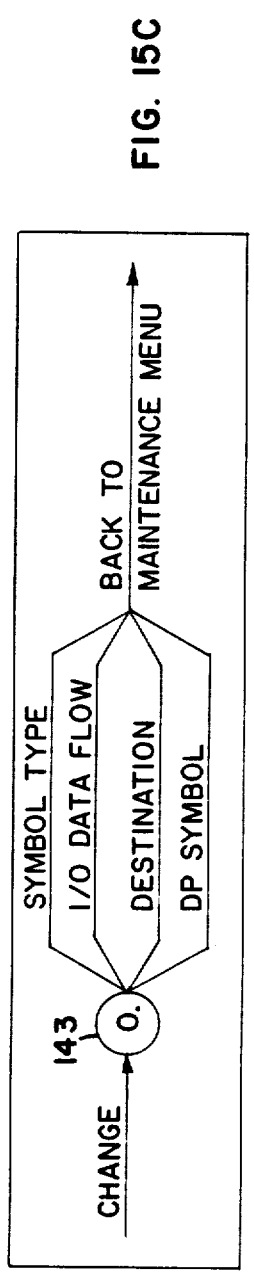
Figure 15D:
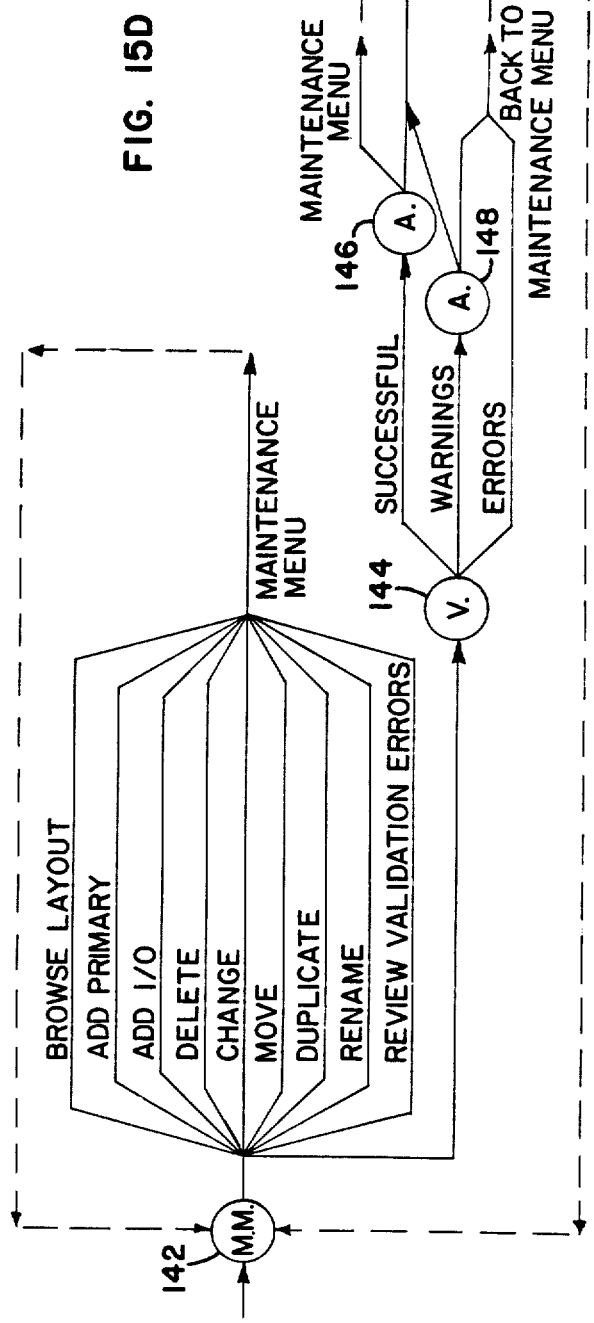

As illustrated in FIG. 15D, prior to exiting the layout phase, the system of the present invention provides the opportunity to modify the layout. The following modification options are provided in the maintenance menu:

1. Browse Layout
2. Add Primary
3. Add I/O
4. Delete
5. Change
6. Move
7. Duplicate
8. Rename
9. Review Validation Errors Under the Browse Layout option, the user can review the overall layout structure.

Under the Add Primary option, the user can add a primary graphics symbol at any point in the layout. The system then offers the following options as to where the user wants to place the symbol:

1. at the beginning of an application;
2. at the end of an application;
3. following another symbol;
4. use it to start a branch path with a connect to symbol; and
5. use it to start a branch path with a go to and return symbol.

Under the Add I/O option, the user can add an additional input or output symbol to one of the process symbols 70 with up to eight input or output symbols being attached to one process symbol.

Under the Delete option, the user can delete any symbol or any group of symbols from the overall layout flow.

Under the Change option, the user can change any symbol; for example, a process symbol to a data processing symbol. If the option is selected, as shown in FIG. 15C at 143 the system offers the following options:

1. A symbol from one type to another;
2. The data flow for an I/O symbol;
3. The destination of a connector;
4. A DP symbol or the argument list.

Under the Move option the user can move any named symbol or group of symbols within the layout to another point in the layout. The system prompts the user for the symbol name and the targeted location.

Under the Duplicate option, the user can move a copy of a symbol or a group of symbols to another area of the layout. The system prompts the user for the symbol names from the existing layout and the target location. The duplicated symbols must be renamed.

The Rename option allows the user to rename a symbol. The system prompts the user for the existing and new name of the symbol. The system provides the user with the option to keep all inputs and outputs attached to the renamed process symbol 70. If a symbol is renamed, it must also be redefined. For example, the screen is renamed in layout, the screen definition phase will ask the user to create a new screen template, or change the name. It will be appreciated, that the maintenance menu might be provided with other options such as the capability to define a branch path before connecting it to the main path of the application.

If the Review Validation Errors option is selected, the system will list all errors in the logic layout. Errors detected by the application development system will be listed on line 23 of the graphics display while overall system errors will be presented on line 24. Possible errors which might be generated in layout validation include:
1. ERROR—No Output in the Application.
2. ERROR—No Stop Symbol in the Layout Period.
3. ERROR—Endless Loops starting at:
4. WARNING—No Loop in the Main Logic.
5. WARNING—These are Unreferenced Symbols Starting at:
6. WARNING—No Input (No Data is Collected) and Ending at:
7. ERROR—No Exit From Subroutine.

Figure 16A:
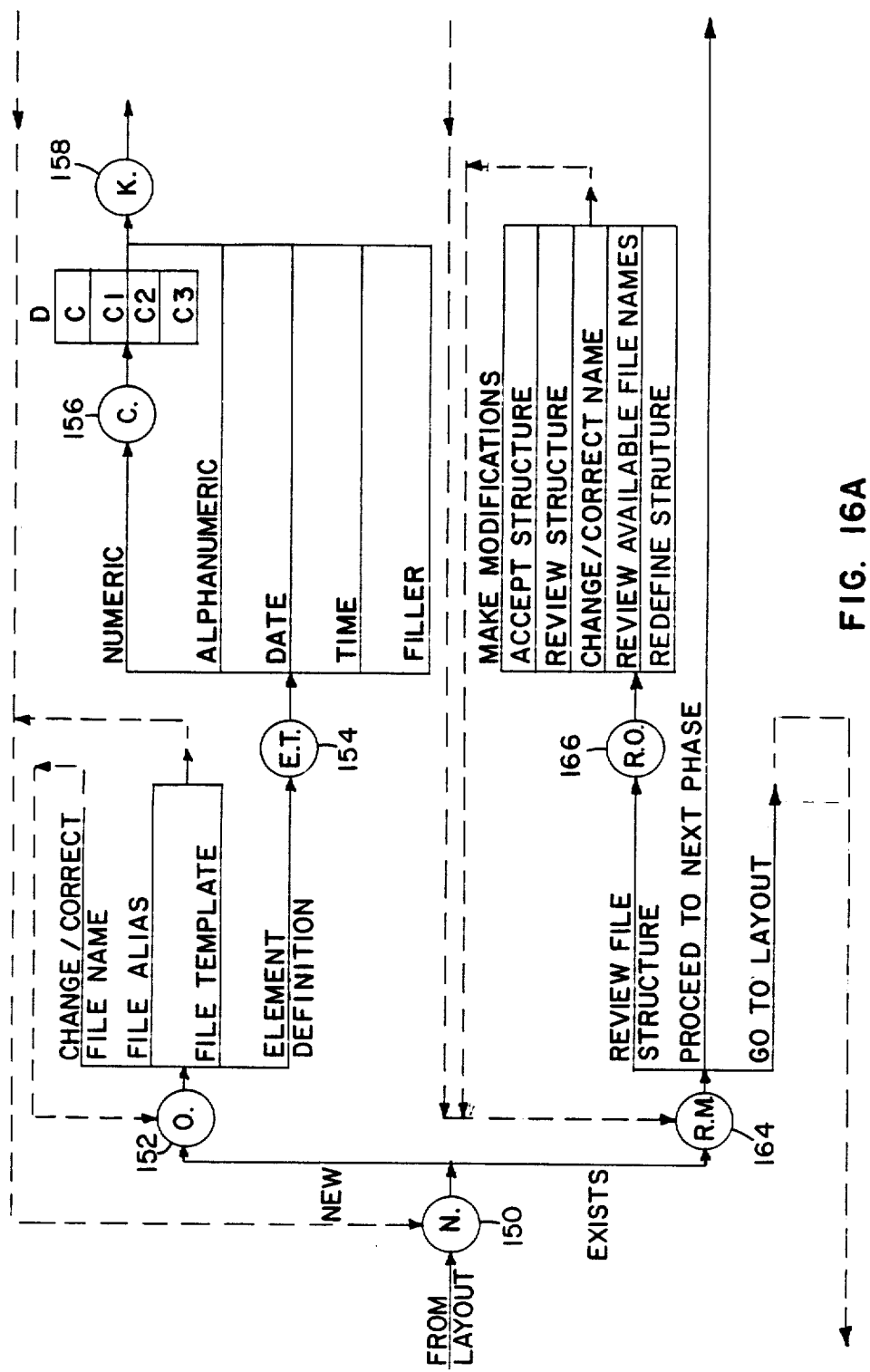
FIGS. 16A-B are a diagrammatic representation of an embodiment of the file definition phase.
Figure 16B:
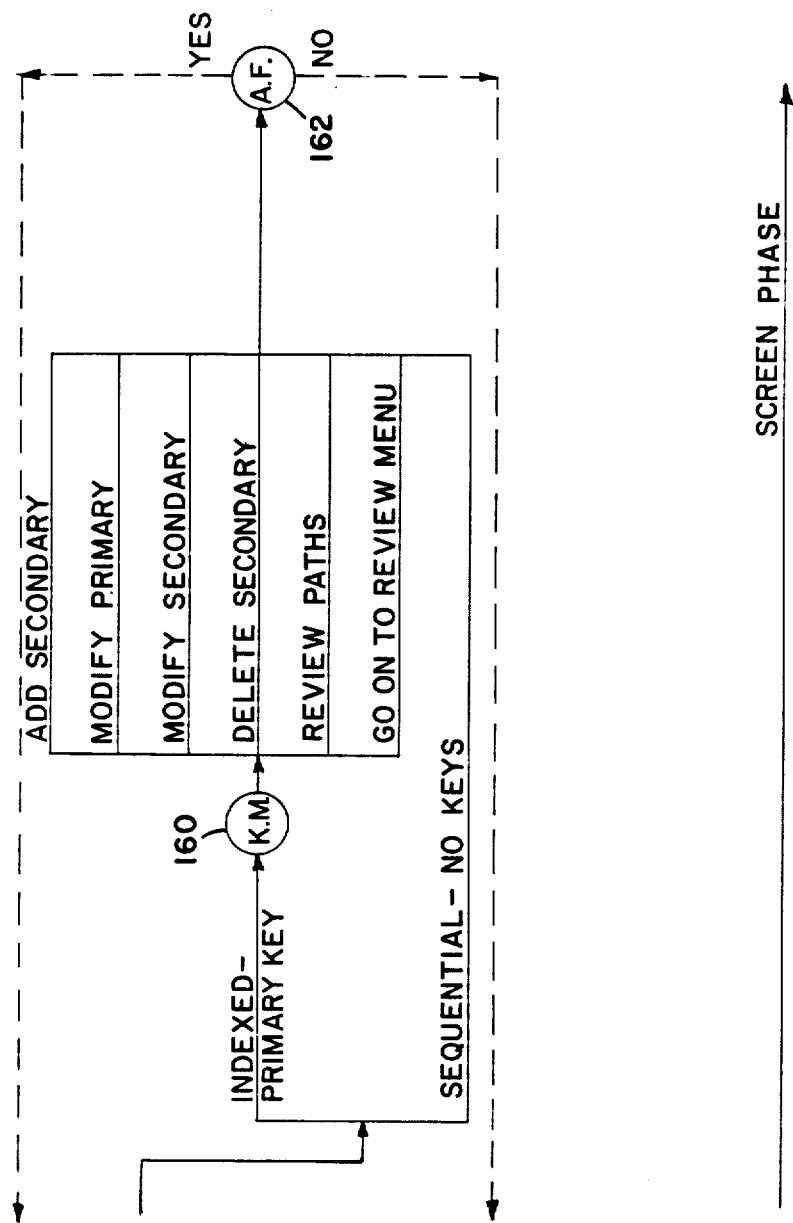

The application programmed development system of the present invention will check to insure that each path in the layout produces a logical loop or logically ends. In addition it will check to make sure that the application has input and output and contains at least one stop symbol. Any errors detected will be displayed. Indicated at location 144 in FIG. 15C, if there are no errors the user will be given the option at 146 to go back to the maintenance menu for further work with the logic layout or progress to the next phase which will be the file definition phase, a sample display presentation for which is illustrated in FIG. 1 and the logic flow for which is illustrated in FIGS. 16A-B. If only warnings appear on a display presentation then as indicated at 148 the user can elect to proceed to the file definition phase or go back to the maintenance menu for further work on the layout. If in fact some errors do appear, then the user must go back to the maintenance menu for further modification of the layout so as to correct the errors.

The file definition phase is the next phase of the preferred embodiment of the present invention. Here, the application program development system contains information about the data files described in the application layout by asking various questions of the user regarding the file and the elements therein. Preferably, the user will utilize the file definition worksheet shown in FIG. 5 during this phase of the appilication program development. The files which are defined might be index files, sequential files, or argument files formed when a subroutine is called. At location 150 the system will prompt the user at the graphics terminal 54 to indicate whether the file is new or already exists. If the file is new to the system, at 152 the user may simply enter the new file by providing an element definition thereof or choose one of the following options:

1. Use the name as an alias for an existing file such that the system associates the new file name to a file already defined. (This file cannot be modified.)
2. Use an existing file as a template wherein the file definition of another file confined within the system is copied and then can be modified.
3. Change or correct a file name.

If the user chooses to enter a new file, the user must define for each file:

1. The File Format;
2. The File Referencing Method;
3. The File Modified Permissions.

Figure 11:
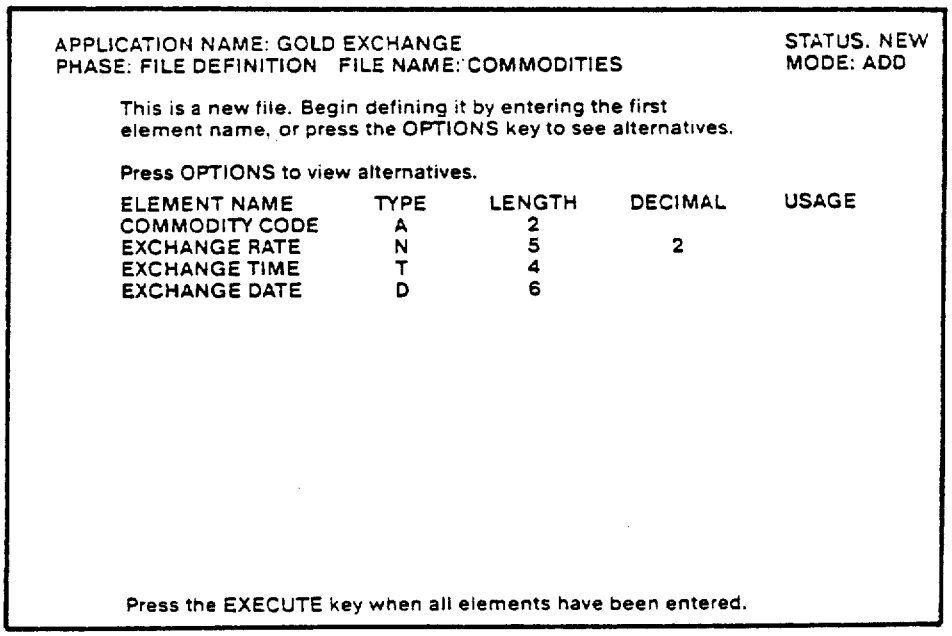
FIG. 11 illustrates a sample display presentation during the file definition phase.

To define the the file format, the user enters the element name, type, length, decimal, and usage as specified on the file definition worksheet as shown in the example in FIG. 5. Information will appear on the display presentation as illustrated in FIG. 11 as it is entered or modified. As illustrated in the logic flow diagram of FIG. 16A, at 154 the element type is selected and at 156 compacting of data specified. The element name "filler" may be used to designate characters not referenced on the file. The operator is prompted as to whether the file is sequential or index as generally indicated by connector 158. If the file is not sequential then at 160 the system asks a series of questions to determine the procedure for referencing each file. Since reference paths are used to gain access to information in the file, the elements are listed the user is asked to define the primary reference. Since the reference may include up to ten elements, a column is provided for entering the sequence number. Once the file referencing has been defined, the system at 160 then offers the user the following options:

1. Add a New Secondary Reference Path;
2. Modify the Primary Path;
3. Modify the a Secondary Path;
4. Delete the Secondary Path;
5. Review All Paths in the File.

Figure 17A:
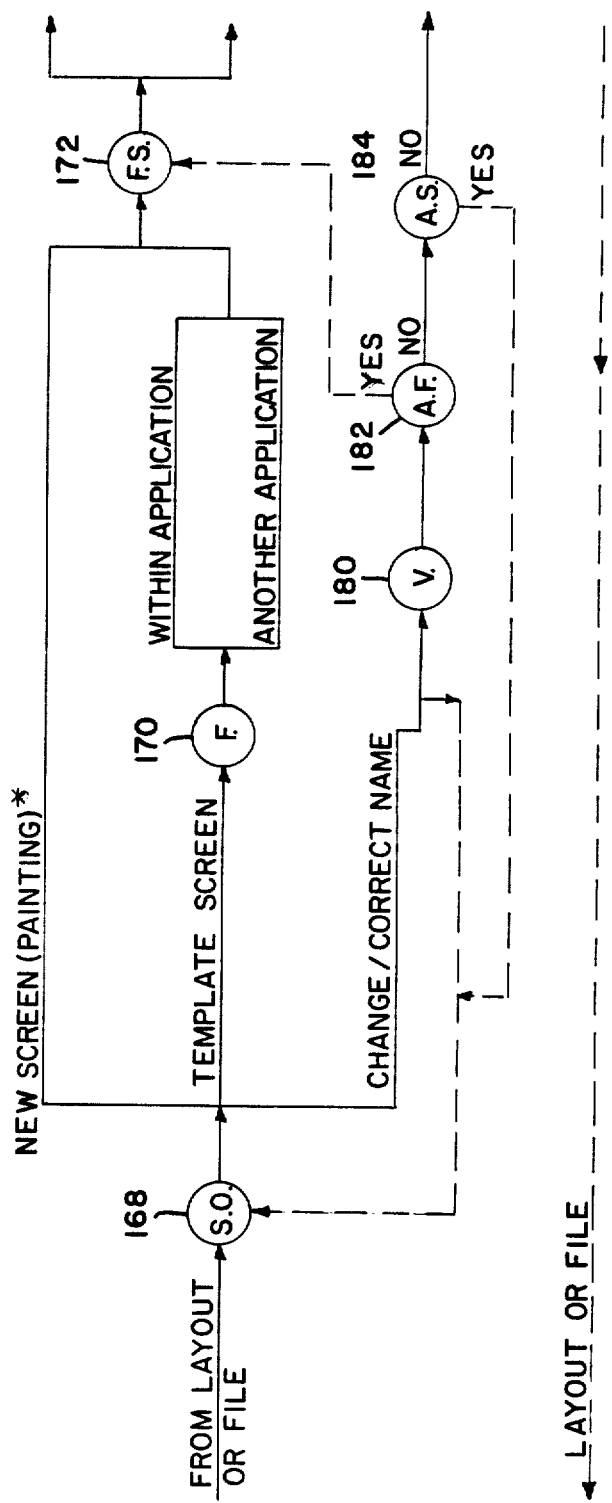
FIGS. 17A-B are a diagrammatic representation of an embodiment of the screen definition phase.
Figure 17B:
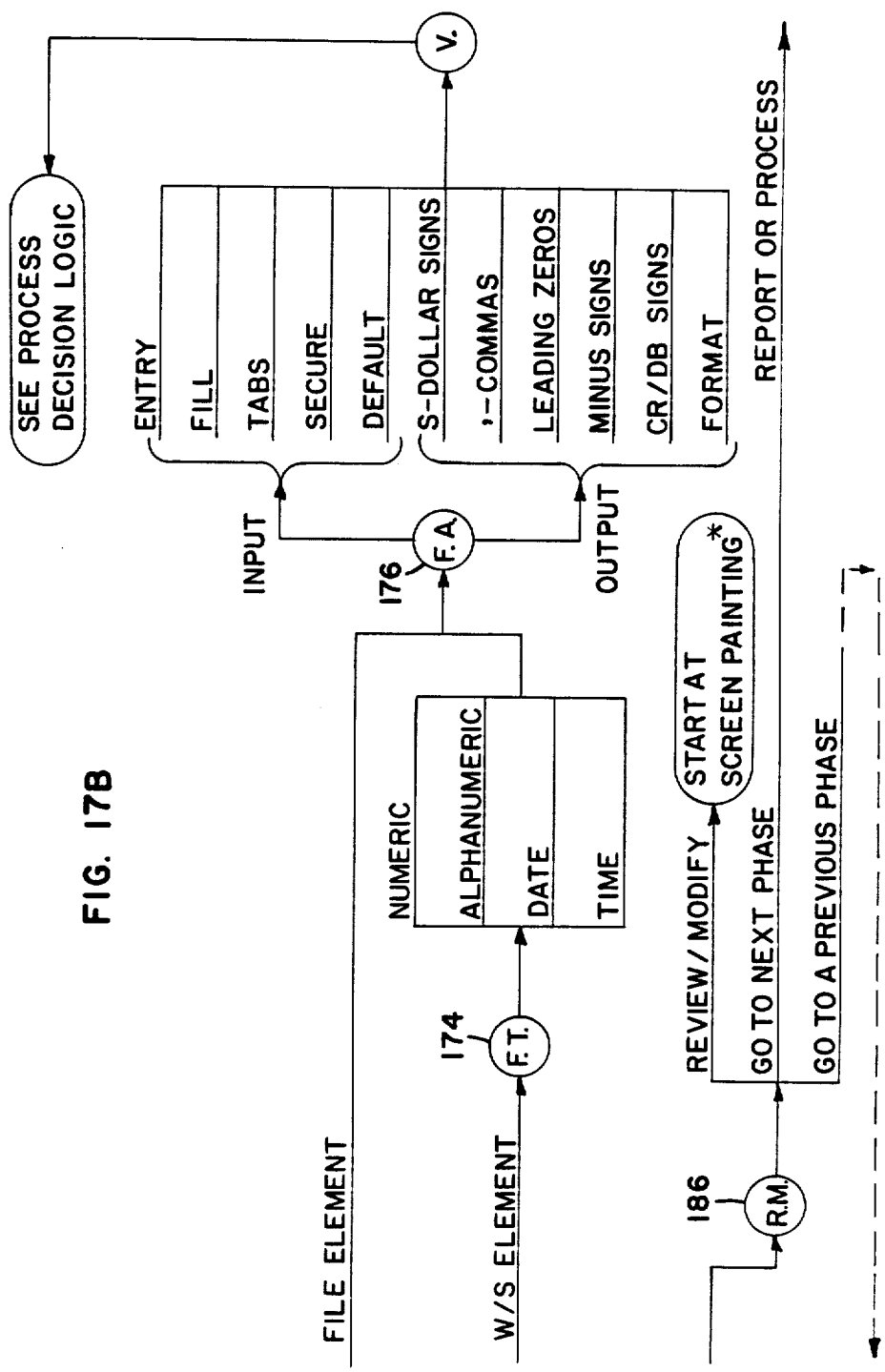
Figure 19:
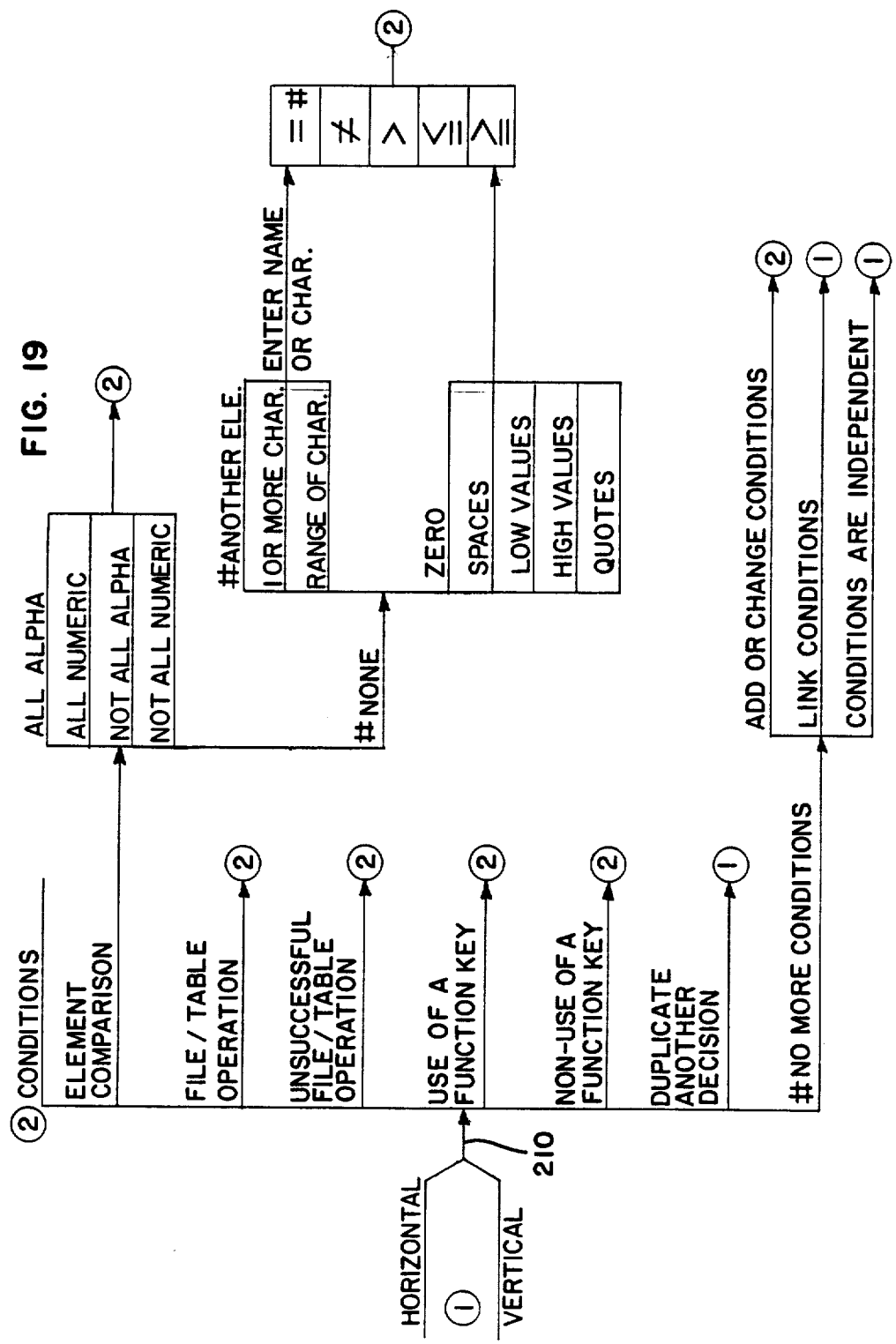
FIG. 19 is a diagrammatic representation of an embodiment of the Decision Paths step of the process phase.

At 162 if a new file is to be defined, the user is returned either to location 150 or a review menu 164. At the review menu 164 the user can select to review the file structure or proceed to the screen definition phase as illustrated in FIG. 17A-B, or go back to the layout. At the review options 166 the user can elect to:

1. Accept the File Definition;
2. Review the File Structure;
3. Change or Correct the File Name;
4. Review Available File Names;
5. Redefine the Files Element Structure.

The program application development system will also ask the user to define other user names who have permission to modify the files format.

At the end of the file definition phase, the user is given an opportunity to review and modify files. When modifying a file, the following functions may be used:

1. Deletion of only the first element or the entire file;
2. Go to a particular element named in the file;
3. Browse a multiple page file definition by scrolling the screen or display presentation up and down;
4. Position the cursor at the beginning of the file.

The next phase is the screen definition phase. A sample screen or display presentation of the system is shown in FIG. 12 while the logical flow is illustrated in FIGS. 17A-B. The screen definition phase is where the screens described in the layout phase are described. The application program development system will ask the user a series of questions about each screen in the layout. The name of the screen will appear in the top of each display presentation as generally illustrated in FIG. 12. As indicated at 168, the preferred embodiment of the present invention offers the user the following options:

1. Create a new screen this name;
2. Use an existing screen as a pattern;
3. Change or correct a name entered during layout;
4. Review other screen names by pressing the options key.

If the user elects to create a new screen with this name the system will ask the user to paint or define a picture of the screen. The user must key underscores for each element on the screen where the application will collect or display data. The number of underscores must equal the length of the element, including all decimal places in any formating characters. The system will designate the row and column of the screen being painted in the lower right hand corner. If the user elects to use an existing screen as a pattern or template the user will be asked to name the screen and as indicated at 170 whether the application from which it should be copied is within the application or within another application and name of the application. The change or correct name option will change all references to the screen in the application. The system will assume that this is a new screen and so it must be redefined. The fourth option is to review screens in the application.

The system asks the user to name the element that will be associated with each of the underscored elements or fields. If the system does not find the element names in a file or elsewhere in the application, as illustrated at 172 the user is asked to define the element for temporary use and to define the element's characteristics as indicated at 174. If one screen is used for both input and output the system will ask the user to define the data flow for each element on the screen. The system will then ask the user to define a number of characteristics for each element including the name, the type as indicate at 174, and the length. Whether the element was found elsewhere in the application or it was defined for temporary storage, the system allows the user to specify additional attributes for these elements. These attributes are defined through responses to dialogue and prompts from the system which as illustrated in FIG. 5 appear generally at the bottom of the display presentation. At 176 in FIG. 17B some of these options are shown for the input and output elements. Some of the options for input elements are:

1. whether entry is required;
2. whether each position in the field must be filled;
3. whether automatic tabbing is to be used;
4. whether minus signs may be entered as part of the element;
5. whether a default value is to be used;
6. whether the field is to be invisible on the screen or secured;
7. whether special character such as hyphens, slashes, periods, etc. are to used.

For the output elements the user can specify:

1. Dollar sign insertion;
2. Comma insertion;
3. Display of leading zeros;
4. Subminus signs;
5. Special characters.

The system enables the user to assign specific criteria to determine valid and invalid responses for each element. For example, the validation can be based on a comparison where the numeric element is of equal value, greater than or equal to, greater than, less than or equal to, less than or not equal to. Similarly alphanumeric elements may be specifically compared to another element. If a screen's elements to be entered or displayed do not comply with the above validation criteria or attributes, the system will display an error message on line 23 when the application is running. Furthermore the system will not reference the next element until a correction is made. If during the screen validation process at 180 it is determined at 182 that another field is needed then the definitions for that field are provided. If at 184 it is determined another screen is necessary then the system will ask as to whether the screen is to be a new one, a template, or a changed/corrected name. At 186, the system lists screens for the application and gives the chooser the opportunity to modify the screens or go to the report definition phase.

In the report definition phase, the user answers questions about the reports named in the layout phase of the application. The sample display presentation or screen is illustrated in FIG. 13. As illustrated in FIG. 18A at 190, the user is offered the options of:

1. Using an existing report as a pattern;
2. Changing or correcting the name entering during layout;
3. Creating a new report.

The first option allows a report to be copied or templated from the application. The second option will allow the name entered during the layout for the report to be changed. If the report is renamed to a previously defined report in the application, the original definition will be used. If the report name was not previously defined in the report definition phase, the system will prompt the user for its definition.

In the report definition phase, the report is created using literal, variable and page number elements to define each line. The system allows the body of the report and the control area to be defined separately. Within the body of the report, the user can define column headings, page counters and detail lines. Within the control area the user can define control headers, subtotal and grand total lines.

As illustrated at 194, the user must define each line by type, that is whether it is reoccurring or nonreoccurring, and the specific line where it will appear. Next the user defines beginning column number and the element type. If the element is a literal, the system will prompt the user to enter the constant value. If the element is a variable, the system requests the name of the element. If the name element has already been defined the system will display the defined characteristics. If more than one element has the same name, the system will prompt the user through a list and until the correct one is found. If the element is to be defined for temporary use, the system will prompt the user to define the elements characteristic such as type, length, and decimal. Whether the element is found elsewhere in the application or defined for temporary use the system tells the user to specify display attributes defining appearance of the field.

The user must define each element in every line. Whenever the user begins to define a new element, the system prompts the user to the next available column on that line. Since all the elements in one line have been specified, the user can lead to a new line or proceed to file control area if the body of the report is complete. The user can also specify for the first element on a new line, when the line should be printed.

When choosing to define the control area of the report at 196, the system asks the user to specify the line type. For each line, it may be designated as a subtotal line, a control header or a grand total line. Totaling is done on the numeric elements found in the subtotal and grand total lines. For the subtotal and control header, the system will request a control sequence number. In addition, the system will ask the user to define the conditions which will cause the subtotal to be taken, how many lines should be skipped before the next line is printed, and certain other information. For the control header, the system will ask the user to define the conditions which will cause the line to be printed, how many lines should be skipped before printing the next line, whether the next line should appear at the top of the next page or be printed on a next available line on the current page, and what element will cause each break.

Once the user has provided information specifying line type and other control factors, the user will be asked to define each element in the line. At 198 the user will then be given the option to define additional elements, lines, or exit to the next report in the application. If this is the last report, the system will list the reports and give the user the opportunity to review or modify them or continue to the next phase.

Figure 14:
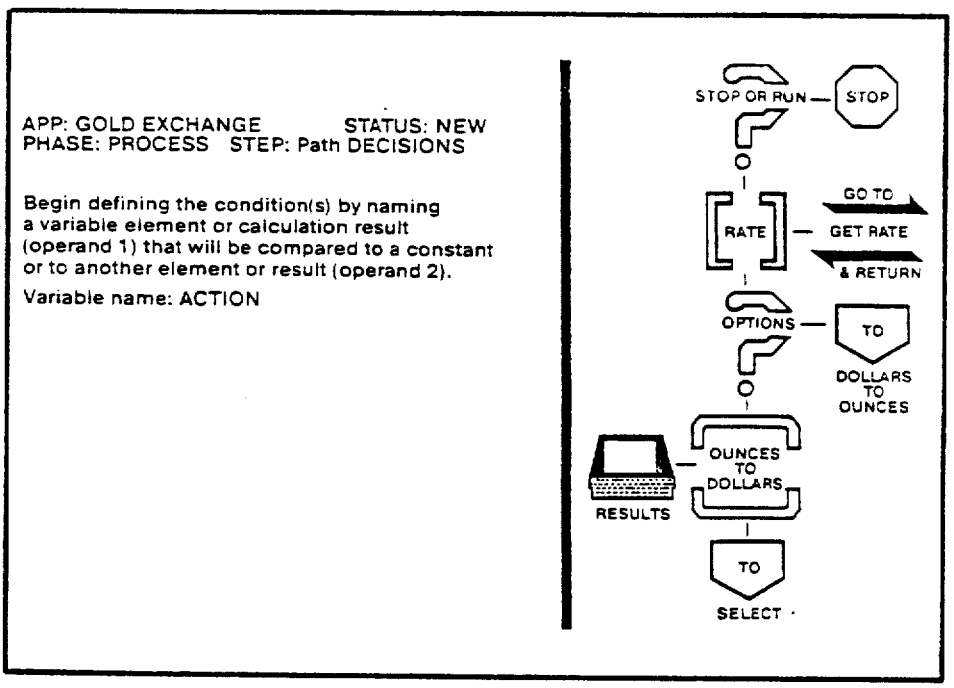
FIG. 14 illustrates a sample display presentation during the process phase.

The last phase of the application programmed development process is the process phase. An example of the screen or display presentation at the graphics terminal 54 during the process phase is illustrated in FIG. 14. As previously indicated and as illustrated in FIGS. 19-23, the process phase consists primarily of five subphases or steps:

1. Decision Paths
2. Where To Derive Elements
3. Data In/Out Directives
4. How To Derive Elements
5. Exception Processing In the Decision Paths step, the application program development system of the present invention asks the user to define the criteria required to take the vertical or horizontal path for every decisions symbol found in the layout. During this step, the system displays the layout on the right hand of the screen and the decision symbol is flashing for the decision currently being addressed. The system prompts appear on the left side of the screen. As generally illustrated at 210 in the logical flow diagram 19, the user preferably will select a path indicated by the less complicated conditions. The conditions might be defined as one of the following options:

1. Element Comparison
2. Successful File Table Operation
3. Unsuccessful File Table Operation
4. Use of a Function Key
5. Nonuse of a Function Key
6. Duplicating Conditions From a Previous Condition Based on the options selected the system asks a series of questions to define precisely when the chosen decision path is taken. The alternate path is taken automatically under all other conditions. Several conditions can be related to one another using boolean logic with and, or conditions. The system will ask a series of questions which will allow the user to connect each condition with an and or an or. If there are no more conditions, the system gives the user the ability to add or change conditions, link conditions, or specify conditions which are independent. Illustrated in FIG. 19 for the element comparison are some of the follow-up questions asked of the user regarding the element comparison.

The next step in the process phase is where to derive elements, the logic flow for which is illustrated in FIGS. 20A-C. In the Where To Derive Elements step, the system asks the user to define for each output symbol in the layout, where each output element will be derived, that is to which process or processes it will be defined. The system first establishes the proper references within each process that has a file attached. The system will ask the operator which "key path" (primary reference or the user's choice of secondary references) the user will use to read the file in the specific process. The system then asks how to read that file in this process. As generally indicated by 220, the user may specify processing the file sequentially from the beginning to the end, one record at a time, process the file with a key greater than or equal to the key paths specified, or process the file randomly using only one specific record in the file.

When determining how a keyed file is to be processed, the user must recall how the file was defined in layout phase and the key path chosen.

This system then displays a screen or display presentation at the graphics display 54 wherein all output elements or file references appear on the left side of the screen and all the process names on the right side. Each element name or file reference must then be assigned to the process or processes from which it is to be derived. As indicated at 222 the user selects from a list of options such as follows:

1. Assign each element to one or more process;
2. Assign several elements to a single process;
3. Assign all elements on the screen to a single process;
4. Review derivations already assigned;

5. Create a working storage element.

It should be noted that in the preferred embodiment, a screen or a report element defined to be the same as the element with the same name in another file and/or screen and/or report causes automatic valuation. Input to one values the others. Derivation of one derives the others. The system will monitor this assignment process and inform the user if all elements have been assigned. While the user is not required to assign all elements and the system will allow the user to return to this step from the How To Derive Elements step, the user cannot delete or modify any derivations once the user leaves this step.

Figure 21A:
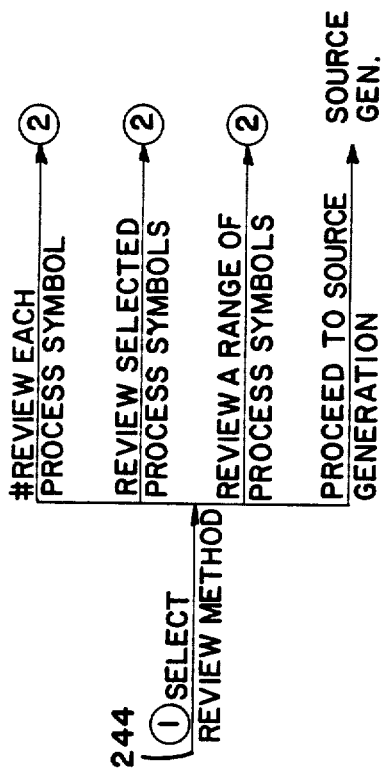
FIGS. 21A-B are a diagrammatic representation of an embodiment of the Data IN/OUT Directives step of the process phase.
Figure 21B:
Figure 23A:
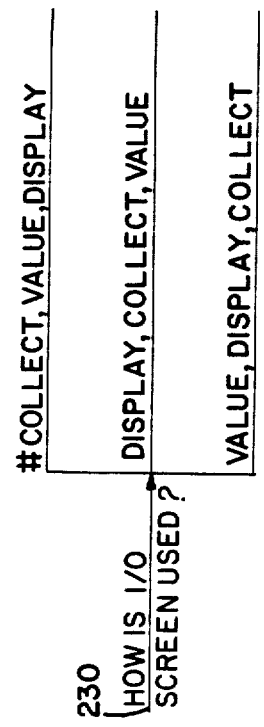
FIGS. 23A-B are a diagrammatic representation of the logic flow of the exception processing portion of the process phase.
Figure 23B:
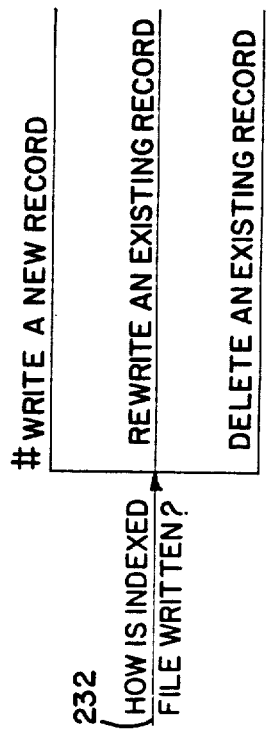

The next step in the process phase is the Data In/Out Directives step the logic for which is diagrammatically illustrated in FIGS. 21A–B. In the Data In/Out Directives step the system asks questions regarding the input and output on the left side of the screen. The layout is displayed on the right side of the screen and flashing is the process symbol containing the input/output symbol being addressed. If more than one input and output symbol for a process symbol is used, the system assumes input first, then data manipulation, then output. If a process symbol has a screen symbol used both for collecting and displaying data, then as generally illustrated at 230 the user is asked to choose one of the following:

1. Collect information, derive elements, display results;
2. Display information, collect changes, derive elements;
3. Derive elements, display results, collect change.

If a process symbol is used with more than one input, the system asks sequence of each. If one of the inputs is an I/O screen, the system will allow the user to sequence the input only if the user chooses option 1.

If a file is used for both input and output, the user will be asked if the user wishes to write, rewrite, or delete as generally illustrated at 232 for each process symbol in which the file is output. At the end of this step, the system the user the opportunity to review any of the input and/or output symbols which have been defined in this step.

Figure 24:
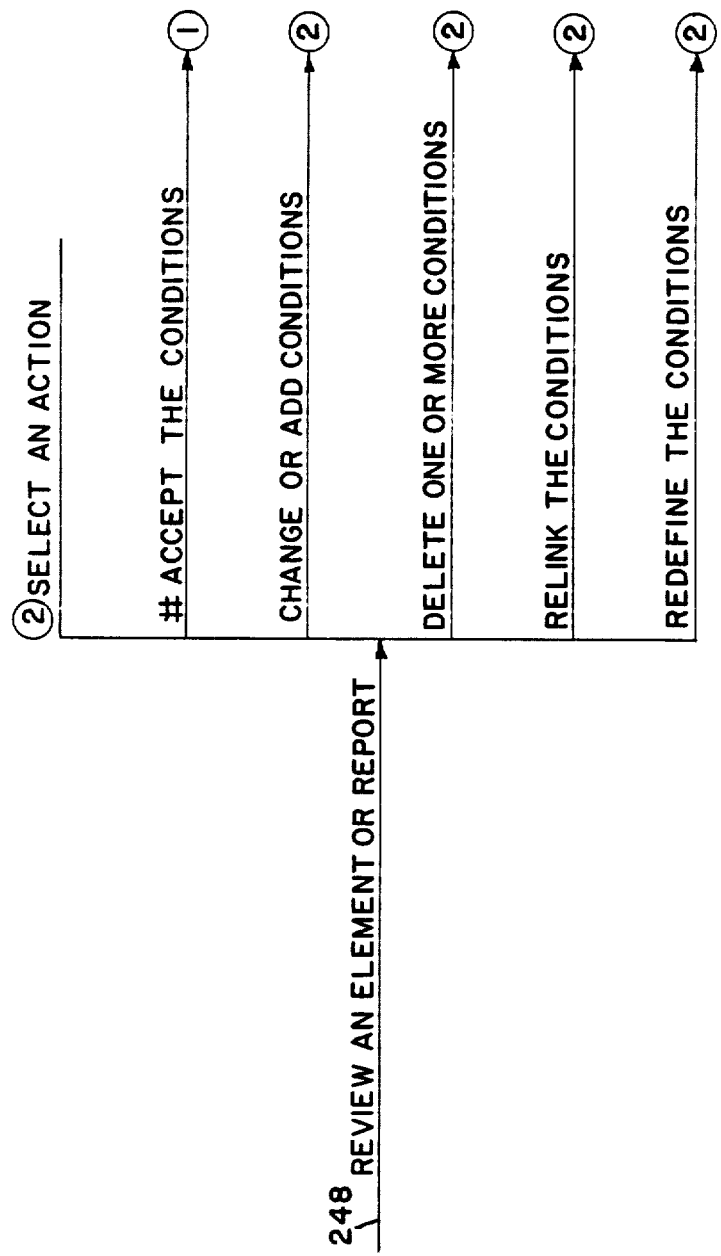
FIG. 24 is a diagrammatic representation of an embodiment of the screen validation during the process phase.

In the preferred embodiment of the present invention, if the user specifies any screen validation in the screen definition phase, the system will give the user the opportunity to review and/or modify this validation as generally illustrated in FIG. 24.

The next step in the process phase is How To Derive Elements. For every element assigned to each process in the Where To Derive step, the system asks a series of questions to determine its derivation. This is accomplished by the system displaying the element name of a specific file, screen or report and the process name. The system then prompts the user in defining the derivation. As illustrated in FIG. 22A at 240 if the element to be defined is an alphanumeric, the system asks the user to choose several options which might be as follows:

1. Equal to another element;
2. Equal to literal or constant;
3. Similar to another element with a derivation you want to use as a pattern.

If the element is numeric, the system asks the user to choose one of several options which might be:

1. Equal to another element;
2. Equal to a literal or a constant;
3. The result of an arithmetic operation;
4. An average of other elements and/or constants;
5. A percentage of another element;
6. Similar to an element with a derivation you want to use as a pattern.

If the element is a date or time type of element, the system offers the user one of the following derivations:

1. Equal to a constant or another element;
2. Results of an arithmetic operation;
3. Similar to any element whose derivation you want to use as a pattern.

When numeric elements are derived mathmatically, the system allows the user to create sophisticated arithmetic operations and the system will generate COBAL compute statements for all arithmetic statements. The system will recognize the following operations:

1. Additions
2. Subtraction
3. Multiplication
4. Division
5. Exponentiation

The system also provides for parenthetical expressions. Within each arithmetic statement there can be six levels of parentheses. Within the parentheses, the sequence of operations is:

1. Exponentiation
2. Multiplication or Division
3. Plus or Minus

Within an arithmetic operation, the system also provides for reversing the value of an element using the uninary sign.

When an element is assigned to more than one process, the user must provide how to derive information for each use. However, the system assists the user with this activity. Each time the element occurs, at 242 the system will automatically display any previous derivations of the element and will provide the user with the following options:

1. Duplicate the above derivation;
2. Modify the above derivation;
3. Create a new derivation;
4. Review another derivation of an element with this name;
5. Use the derivation of a different element as a pattern for this one.

If an element that has not been assigned to a process in the Where to Derive step is used, the system will offer the use of the option to return to that step or use another element. If the user uses an element that is not previously defined in the application, the system will offer the user the option to return to Where to Derive step to define it and assign it to a process for derivation.

Prior to completing this step, the system gives the user the opportunity to review and/or modify any elements.

The next step in the process phase is the exception processing step. With completion of the previous four steps, the user has described the activities to be performed within each process symbol. The system allows the user to further define when these activites should not be performed. For example, do not perform an activity if one of the elements is equal to zero. As indicated at 244 and 246 in FIGS. 23A-B, the system lists the process symbols for the layout and offers the following menu:

1. Review each process symbol with the option of skipping some statements based on a decision;
2. Review selected process symbols;
3. Review a range of process symbols;
4. Proceed to source generation.

If the user selects options 1, 2, or 3, the system displays each activity or group of activities in the specific process symbol and asks if there is any reason not to perform all or any part of these activities. The user is asked questions to define the conditions which can cause this group to be performed or not performed. This is similar to the questions asked in the Decision step. This takes place at 252.

After completing these three phases, the system is able to produce COBAL source, program documentation, and job control language. The documentation might include:

1. A consecutive listing of symbols used in the used in the layout;
2. Symbol name list;
3. File descriptions;
4. Screen descriptions.

When a new application is being created, all the above documentation might be produced. If an existing application is being worked on, the system will ask the user which of the above documentation the user wants.

DETAILED DESCRIPTION OF COMPUTER PROGRAM

Figure 25:
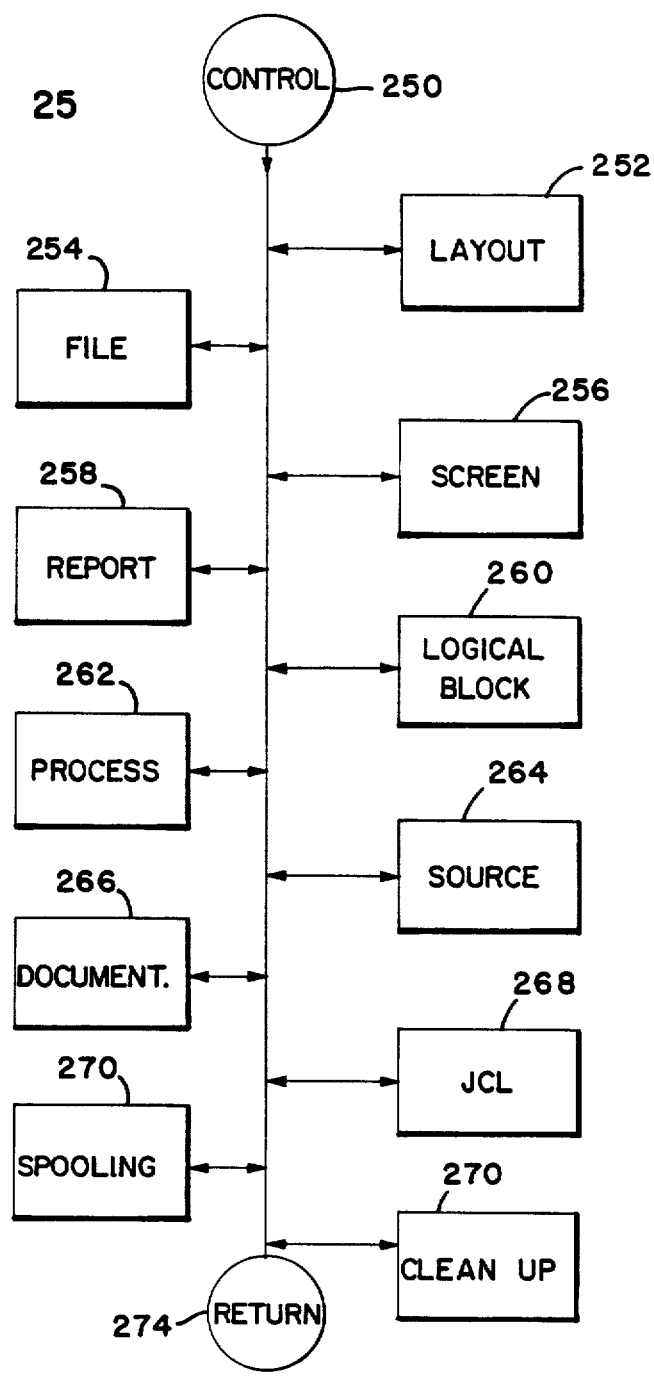
FIG. 25 is a block diagram of the subsystems of a digital program of one embodiment of the present invention.

A subsystem arrangement of an embodiment of a computer program in accordance with the principles of the present invention is illustrated in FIG. 25. The embodiment of the digital computer program shown will utilize the following data base files:

Installation File

An Installation file 280 contains information which relates to either global operations throughout the system or installation specific information which is unique to the particular user site. Examples of global information will be tables, includes, and subroutines. Examples of installation specific information will be JCL streams, source libraries, and environment descriptions.

Data Dictionary File

A Data Dictionary file 282 contains all the global file/data base elements that are used or could be used by any user developing an application with the system at a particular site. The Data Dictionary 282 is organized in file and/or record name by element order and is usually accessed by element name. The Data Dictionary file 282 will include the element name and all of its various attributes.

File Dictionary

A File Dictionary 284 contains file specific information for all files and/or records within the Data Dictionary. This information includes access security and applications which use a particular file. Accordingly, the File Dictionary 284 contains a list of the applications using each particular file. The File Dictionary file 284 is accessed by field name and/or record.

Internal Element File

A Internal Element file has the basic same format ad the Data Dictionary file 282 except that it is only for a single application. It also includes the working storage elements for the application. The Internal Element file 286 will include the element names and their attributes. It is accessed by element name.

Maintenance File

A Maintenance file has the same general format as the internal element file except that it can contains only elements which have been changed, added and/or deleted during the course of a particular file maintenance run. The Maintenance file will include the element names and their attributes. It is accessed by the element's name.

Layout File

A Layout file 290 contains a representation of the logic flow of the application along with the type of I/O that is used in the application and where it occurs in the logic flow. The Layout file serves as the controlling file for the application program development process. For each functional symbol and I/O symbol entered by the operator at the graphics display 54, the Layout file will include a record of its type, name, a unique index pointer or identifier reflecting the order of selection by the operator of the symbols, pointer to the previously selected symbol, and a pointer to the subsequently selected symbol. In addition, for I/O symbols the Layout file 290 will include the flow of the I/O. The Layout file 290 is accessed by the symbol pointer, the symbol type, and the symbol name.

Application File

An Application file 292 contains the name and type of each of each I/O symbol entered by the user in an application and the number of times that particular named I/O symbol occurs. This file is primarily utilized as a quick reference file to indicate whether a particular I/O type has been utilized. It is also used during the maintenance phase. If a particular I/O is deleted, the count reflects if any occurrence remains. The Application file 292 also contains the remarks section of the application being created wherein the user's notes or comments regarding each symbol are stored. The Application file 292 is accessed by the symbol type.

Ancestor File an Ancestor file 294 contains the symbol pointer of the symbol in any path that is referenced via a skip or jump in the logic. In addition it contains the symbol type and pointer of the symbol that caused the logic transfer. The Ancestor file 294 is accessed by the symbol pointer which is the distination or jump.

Screen Dictionary

A Screen Dictionary file 296 contains the row and column of each element and literal associated with a given screen. It also contains all edit criteria that was designated for any particular element. The Screen Dictionary file 296 also contains a pointer to the Result Table file if any validation criteria was built for any screen field. It is accessed by screen name by application. There is a Screen Dictionary file 296 for each application.

Report Dictionary

A Report Dictionary 298 contains the same general information as the Screen Dictionary file 296 for all reports. With the exception that, the pointer to the Result Table represents the criteria to determine under what conditions a particular print line should be sent to the printer.

Logical Block File

A Logical Block file 300 contains each logical block as part of the total logical flow and all paths which relate or input to that path. The Logical Block file includes all of the logic flow which might influence a given output. The Logical Block file is accessed by an identifier for each block and an identifier for each path within a given block.

Result Table

A Result Table 302 contains multiple record types of all information concerning actions that must occur during execution of the application being created. This includes the decision logic and I/O actions that are to occur; however, its main purpose is to identify where each element is to be valued and how it should be valued in the various logical blocks and paths it occurs in.

Process Dictionary

A Process Dictionary 304 contains all execution actions that need to occur and the order they should occur in as represented by the individual symbols in the logic flow created during the layout phase and represented by the Layout file 290.

Source File

A Source file 306 contains the exact source statements for the application that is being created including Data Division, Procedure Division, Comments, BMS Maps for CICS applications.

Spool File

A Spool file includes the Source file information in a format that can be handled by a system reader.

JCL File

A JCL file contains the job control language to enable source generation by the particular system.

It will be appreciated, that the digital computer program will have numerous other data base files and information to accomplish various tasks which are required of a digital computer program of this nature.

Figure 26:
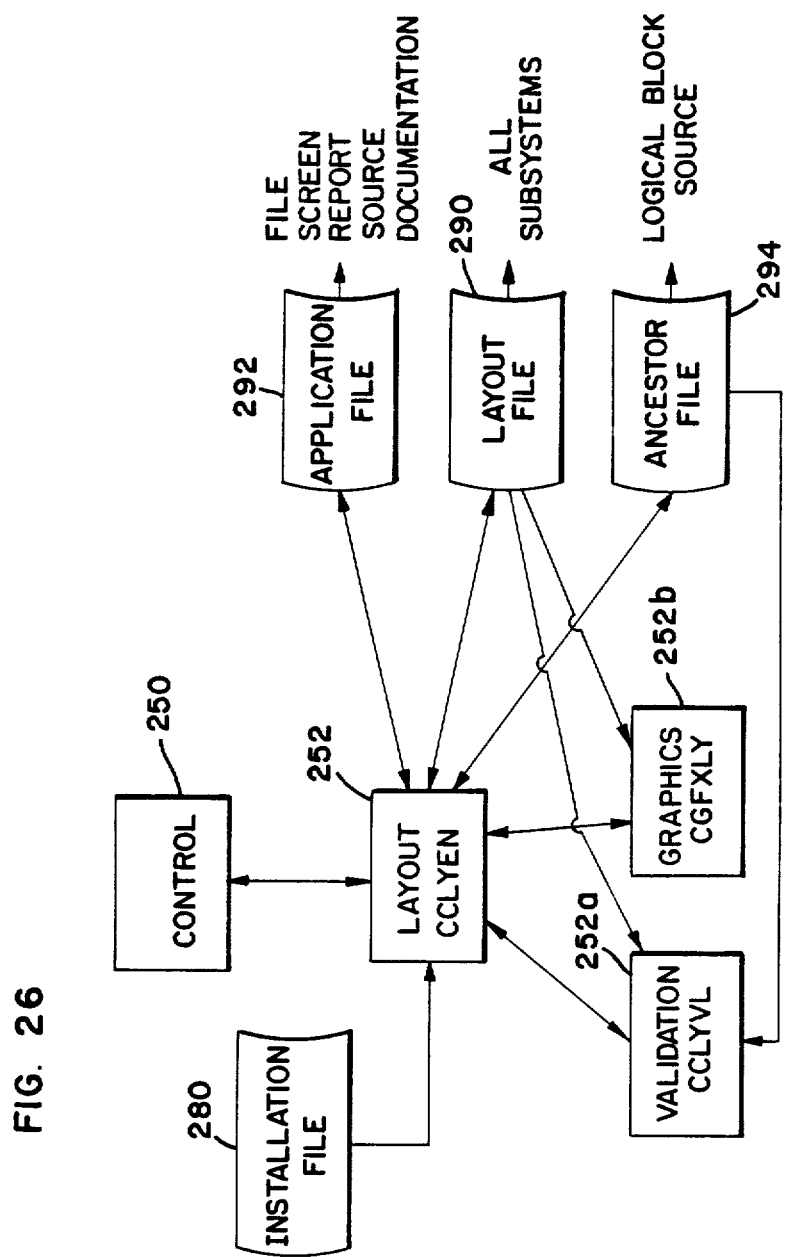
FIG. 26 is a block diagram of an embodiment of the layout subsystem.

Illustrated in FIG. 26 is a block diagram of the layout subsystem 252 showing its interaction with the data base files. The layout subsystem 252 corresponds to and is the controlling portion of the program for the layout phase of the application development process. As each of the functional symbols and input/output symbols are entered by the user, they are stored in the Layout file 290. The symbol's name and type are saved. In addition, each symbol stored in the Layout file is assigned a unique pointer value reflecting its order of entry by the user. If the user designates I/O for the process symbol 70, the I/O type, name, and flow are also stored in the Layout file 290 as well as an index pointer. As previously indicated up to eight of the I/O symbols may be attached to one of the process symbols 70. Also saved is the pointer of the symbol previously entered and the pointer of the symbol which is subsequently entered. Accordingly, the layout subfunction 252 collects a picture or representation of the logic flow of the program that is to be created and stores this information in the Layout file 290. In addition, the layout subsystem 252 includes a graphics function 252a which utilizes the symbol type information in the Layout file 290 to display on a $3 \times 7$ matrix on the right hand of the graphics display 54a pictorial representation of the logic flow as it is built. The validation subfunction 252a updates the Ancestor file 294 to insert the symbol type and symbol pointer of the destination symbol in any logic path which results from a branch or skip in the logic. In addition the symbol pointer and type of the symbol that caused the logic transfer are also inserted into the Ancestor file 294. Examples of when this might occur, are the use of the connect to symbol 76, the go to and return symbol 78, etc. As previously indicated, the present invention informs the user if any of the logic paths are incomplete or not logically connected to the remainder of the flow. The validation function 252a will search through the Layout file 290 utilizing the forward pointer and backward pointer fields to determine whether the logic is complete in the forward direction. For example, have all branch paths returned to the main path or go to a stop symbol. In addition, the validation function 252a will ensure to obvious loops occur in the logic. The validation function 252a will also search the Ancestor file 294 to make sure that all logical flow paths are connected to the overall logic flow of the application. For each of the symbol pointers in the Ancestor file representing the first symbol in a logic path, a check is made of the corresponding symbol pointer of the symbol that caused the logic transfer to make sure that it has not been deleted from the Layout file 290 such that the logic path is isolated from the main logic flow of the program. In addition, the validation function 252a will check the Application file 292 to make sure that an output has been defined. As previously indicated if no output has been defined an error symbol is displayed. The validation function will also check the Application file 292 to see if any input has been defined. If no input has been defined, a warning indication will be displayed at the graphics display 54. Whenever the user requests a modification of the logic flow, the Layout file is accessed by the symbol name so that the Layout file 290 can be appropriately updated. For example, if a series of functional symbols are to be added to the logic flow, the layout file will provide the backward pointer for the first symbol in the series as well as the forward pointer for the last symbol in the series. Once the layout phase has been completed, the layout file 290 becomes the director of all of the other subsystems in the program to dictate the requirements and direct their dialogue or interface with the user at the graphics display 54.

Figure 27:
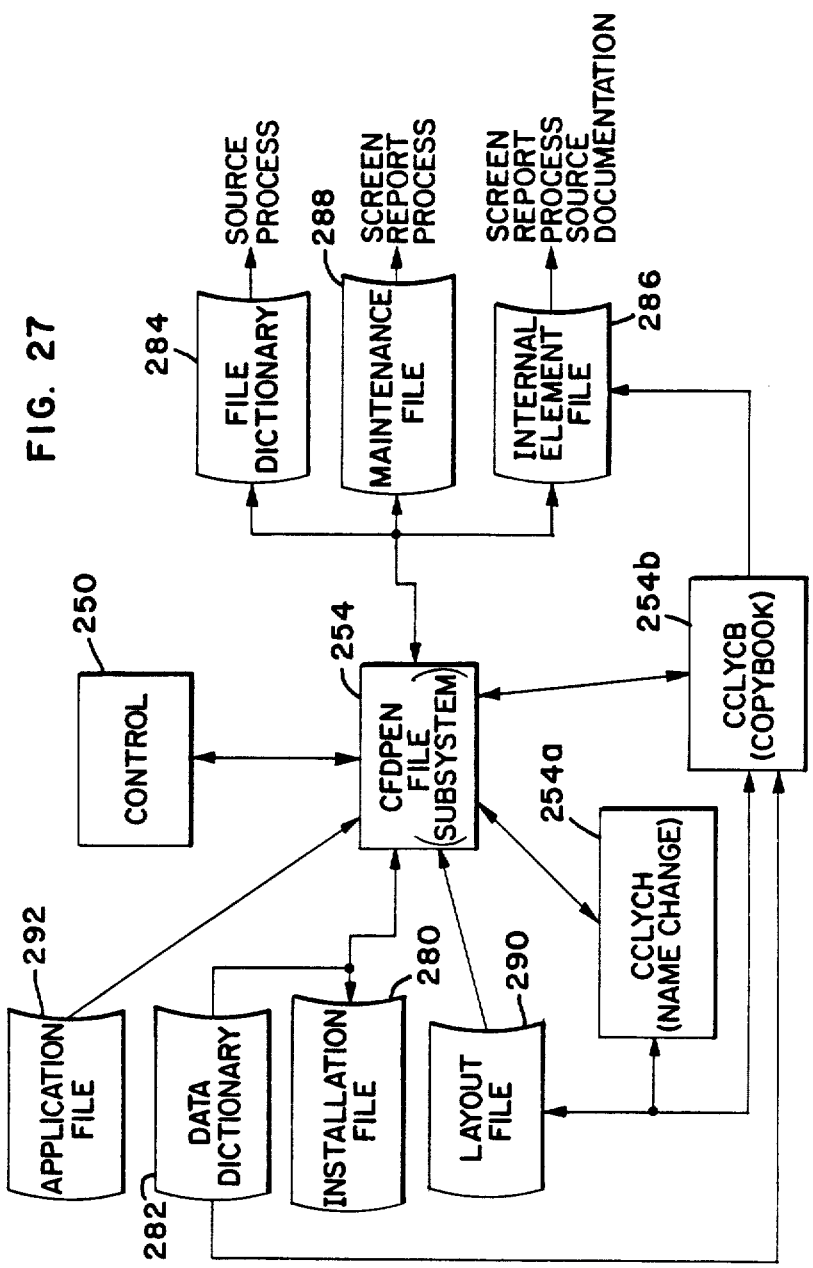
FIG. 27 is a block diagram of an embodiment of the file subsystem.

Illustrated in FIG. 27 is the file subsystem 254 of the program. The file system 254 corresponds to and controls the file definition phase of the application program development process. Its major function is to collect the specific record information for the files and/or data base structures that will be used within an application. The file subsystem 254 will make a quick check of the application file 292 to ascertain whether there are any such files. It will then sequence through the file symbol types in the Layout file 290. For each file symbol type located in the Layout file 290, the file subsystem 254 will search the Data Dictionary to ascertain whether this is a globally defined file. If the file name is found in the Data Dictionary file 282, the file subsystem 254 will store the information for the file in the Internal Element file 286 which includes all of the files and data base information for the application being worked on. If the file name is not found in the Data Dictionary file 282, then the file subsystem will display the presentation as generally illustrated in FIG. 11 and collect the information regarding the named file. This information is then stored in both the Data Dictionary file 282 so that it becomes a global definition and the Internal Element file 286. The file subsystem 254 includes a function 254a which allows a file name to be changed or corrected if necessary. The name change function 254a will then update the Layout file 290 to reflect the correct name. In addition, the file subsystem 254 performs any modifications as indicated by the operator in the film definition stage and will store the old elements in the Maintenance file 288 so that the other subsystems can check this file to determine if any modifications have been made. In addition, the file subsystem 254 provides a copybook function 254b which enables existing elements in the Data Dictionary file 282 to be copied and modified or renamed by the user during the file definition phase. The major function of the file subsystem 254 is thus to collect specific record information for the files and/or data base structures to be used within an application. The structures are either included within the application or created for the application based on the Layout file 290. The Main Data file of the file subsystem 254 is the Internal Element file 286.

Figure 28:
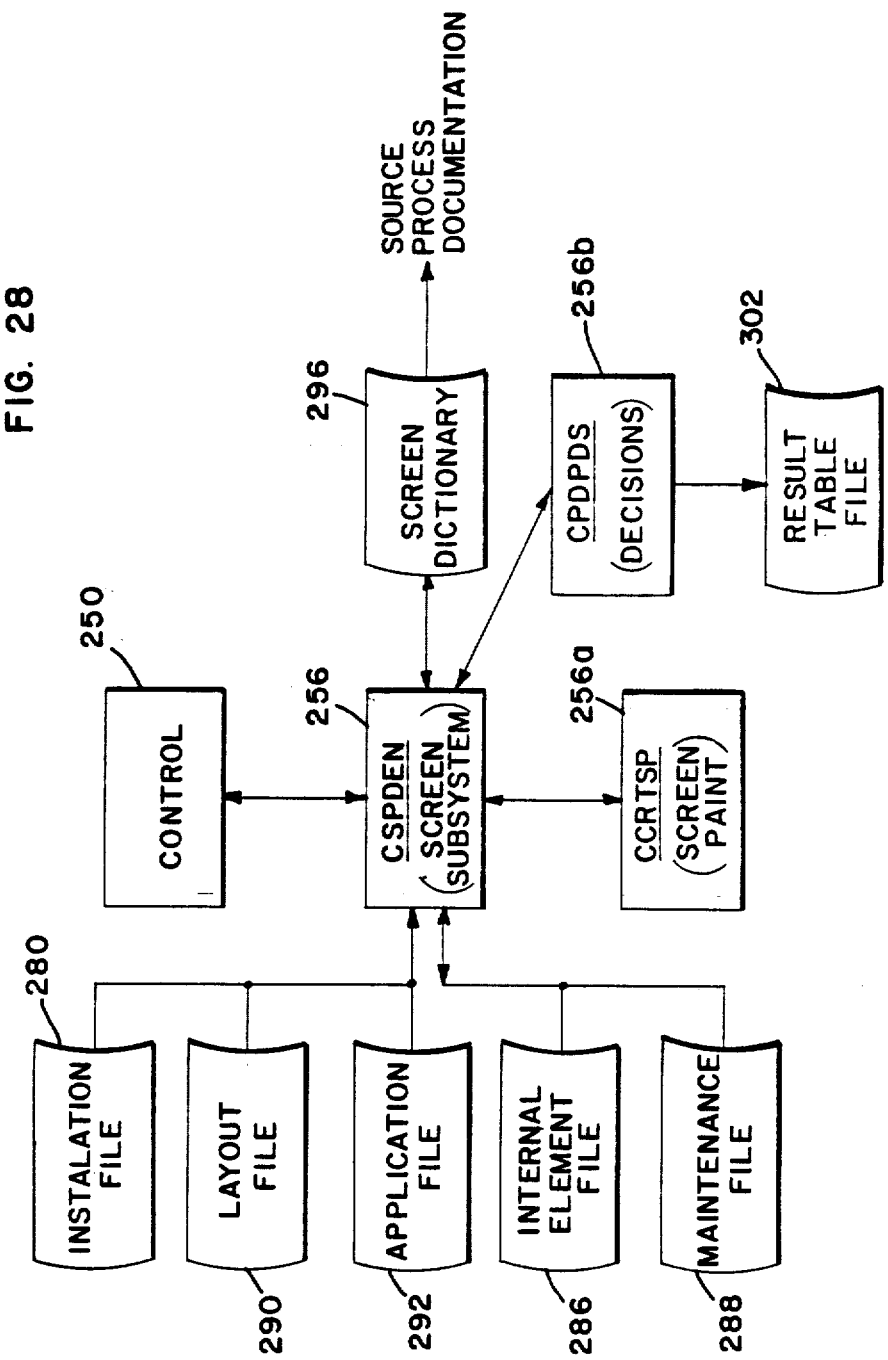
FIG. 28 is a block diagram of an embodiment of the screen subsystem.
Figure 29:
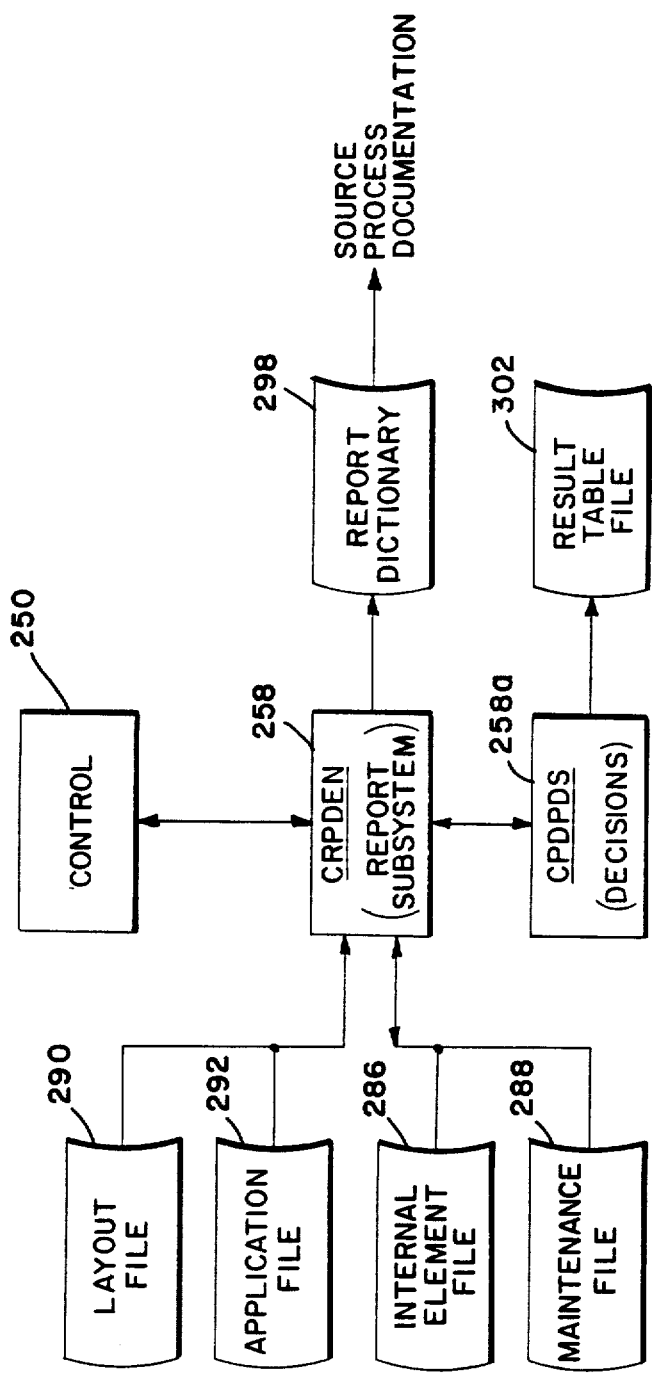
FIG. 29 is a block diagram of an embodiment of the report subsystem.
Figure 30:
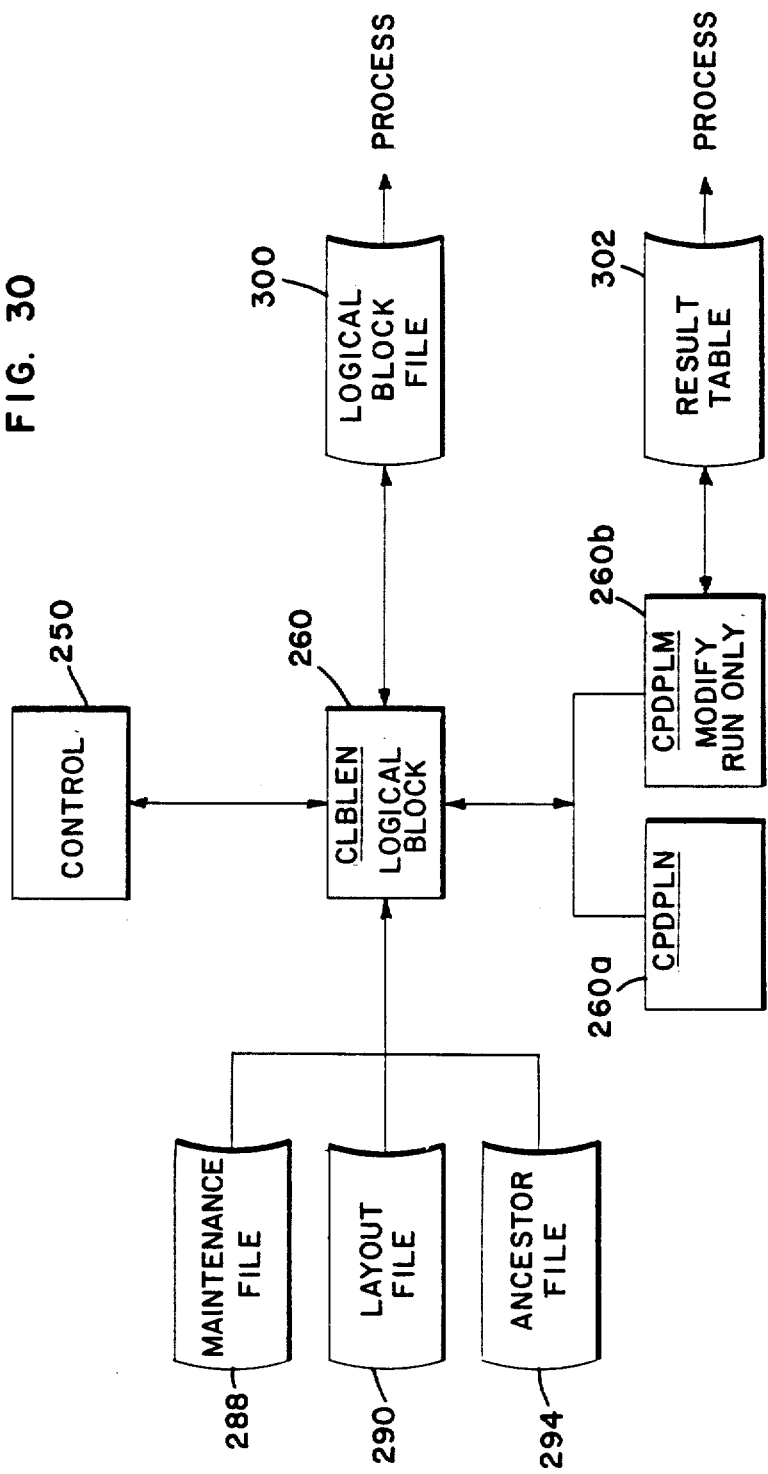
FIG. 30 is a block diagram of an embodiment of the logical block subsystem.
Figure 31:
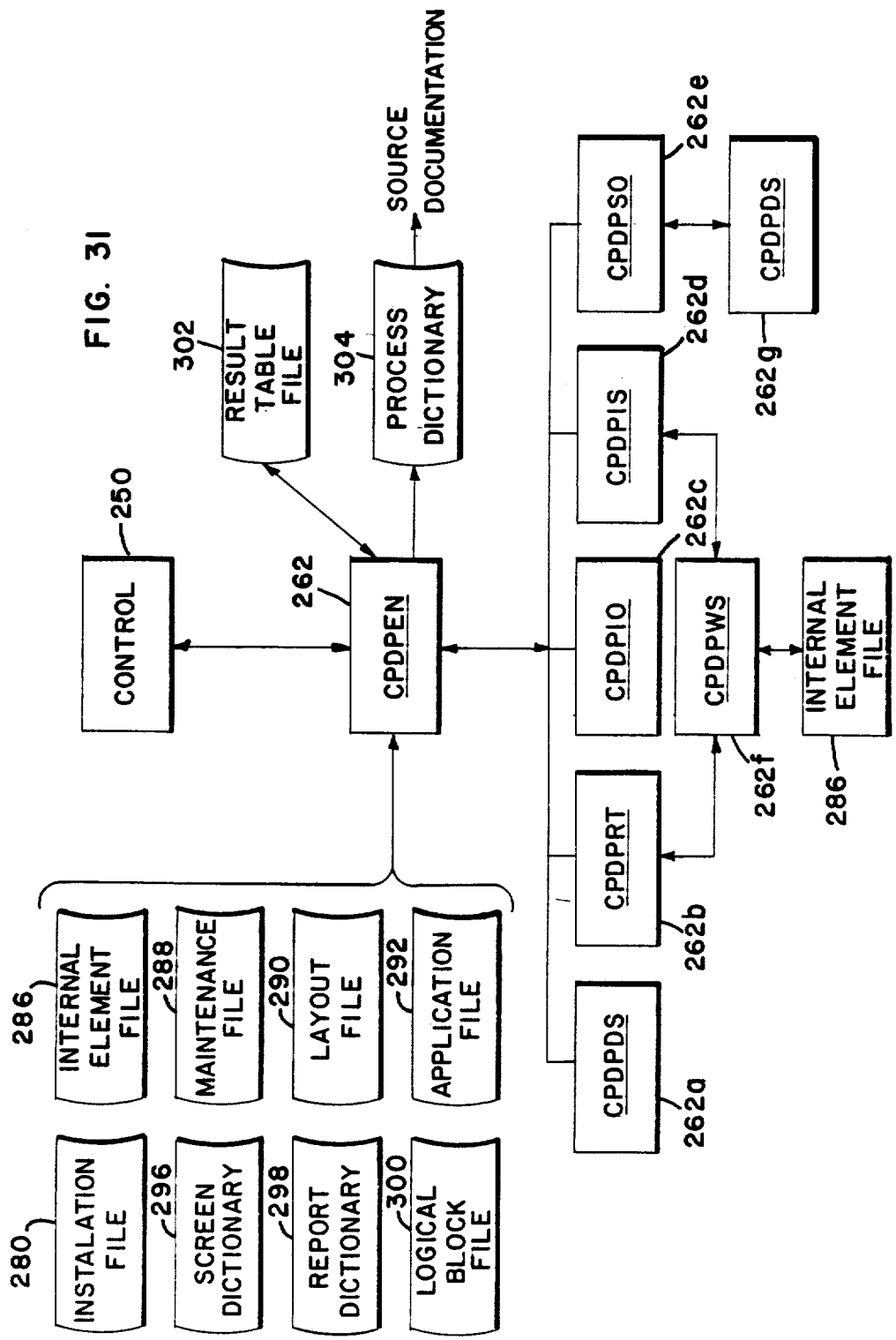
FIG. 31 is a block diagram of an embodiment of the process subsystem.

Illustrated in FIG. 28 is the screen subsystem function 256. The screen subsystem 256 controls and corresponds to the screen definition phase of the application program development process. The screen subsystem 256 will check the Application file 292 and the Layout file 290 to determine if any screens were included in the logic flow. If no screen types of output were included in the logic flow, the screen definition phase is not performed. The screen subsystem accesses the Internal Element file 286 during the definition of the fields that will be created or displayed during the I/O operation. If the field (element) already exists in the Data Dictionary file 282, it is marked. If it has not been previously defined the user is required to define it at this time. During a maintenance run the Maintenance file 288 is checked by the screen subsystem. If it finds any elements that have been modified that are used in any screens, the user is requested to redo these areas of the screens. In conjunction, if the user modifies any fields on any screens, the maintenance file is updated for the remainder of the subsystem to act on. If the user chooses to create a new screen, a screen paint function 256a will monitor the screen painting process so as to record the location of the various elements and their definitions. As previously indicated, during the screen definition phase the user can assign specific criteria to determine valid and invalid responses for each element upon the screen. The user is given the option to attach validation criteria to any of the screen input fields. If this option is chosen, the decisions function 256b is called and creates the field validation criteria. This criteria is stored in the Result Table file 302 and the pointer associated with this criteria is stored in the Screen Dictionary 296. The screen subsystem 256 will as a result of the user inputs, update the Screen Dictionary file 296. The row and column location of each element and numerals associated with a given screen as well as any edit criteria that was designated for a particular element.

The report subsystem 258 forms a similar function as the screen subsystem 256. Once again, if there are no reports in the application as determined by looking at the Application field 292 and the Layout file 290, the report definition phase is skipped. The report subsystem 258 includes a decisions function 258a similar to that of the screen subsystem 256b for updating the result table 302 as required. The primary output of the report subsystem is the Report Dictionary file 298 which is similar to that of the Screen Dictionary 296.

The purpose of the logical block subsystem 260 is to break the logic flow into workable pieces for the process subsystem 262. This is done by breaking the flow at each output operation. That is, using the Layout file 290, all the symbols sequentially from the start of the last output to an output operation are grouped together. Then, using the Ancestor file 294, all the symbols in the paths which enter this logical block and therefore can effect the value of the output field are also grouped together. These logical blocks and paths which have identifiers assigned thereto then dictate the organization of the Result Table file 302 through the process subsystem 262.

The purpose of the process subsystem 262 is to identify and define all execution actions which will occur during the course of the logic flow as described during layout. This is done in several steps:

The CPDPDS function 262a collects the decisions or conditions which will cause either a shift in the logic flow (as represented by an icon in layout), screen validation criteria, report line printing decisions or the execution of process action step (I/O or element).

Its main purpose is controlled by the Layout file 290. It searches the Layout file 290 via the symbol type index. It then allows the user to specify the condition that need to be met for the continuation of the logic flow or the transfer of the logic flow to another path. A single condition may be all that's necessary or there may be a string of conditions which will be linked together by boolean ands or ors.

These condition(s) are stored in the Result Table file 302. The first condition has the appropriate Layout file 290 pointer for access and has a next Result Table file pointer if there are nested conditions.

The CPDPRT function 262b serves two major purposes:

1. Allow the user to specify the file access method that should be used for all data base input operations.
2. Identify and record in the Result Table file 302 the location(s) within the logic flow where each output element should be valued.

The file access to be used is stored in the Result Table file 302 by both the Layout file 290 index pointer in which the function should occur as well as the logical block identifier in which it resides.

The output elements are stored in the Result Table file 302 by the logical block identifier and path identifier where their valuation will occur, this allows the valuation CPDPIS function 262d to control its process.

The CPDPIO function 262c sets the order of all I/O functions that are to occur within one process based on the formula that all inputs occur before outputs.

The functions are then sequenced in the Result Table file 302 recording the layout file index pointer and the appropriate logical block for collection later by the CPDPSO function 262e.

If any process has multiple input functions the user determines the order of these operations.

The CPDPIS function 262d converses with the user to determine the type of operation that needs to be created to satisfy the requirement that each output and intermediate element must be valued in each of the positions detected by the CPDPRT function 262b. If intermediate elements are used the valuation of the element is not satisfied until all the elements that make up a valuation have been valued or exist as an input to this application.

The CPDPIS function 262d also ensures that the valuation is consistant and logical. For example, $$A = X + Y \text{ and } X = A + B$$

is not logical. In this condition the user is warned and asked to correct.

These valuations are stored in the Result Table file 302 in logical block sequence that was established by the CPDPRT function 262b. This is necessary since a previously defined output result may be a source (input) field to an output that will occur in the later logical block.

The CPDPSO function 262e functions to create the Process Dictionary 304 in order of the Layout file 290. This is done by taking the operations stored in the Result Table file during the preceding process phases and translating them in the correct order for each layout icon in the Process Dictionary 304.

Two separate operations occur during this process:

1. Since CPDPIS works from the final output backwards towards some source element, the operations are backwards in the Result Table file 302. CPDPSO reverses this order while it creases the Process Dictionary file 304.
2. CPDPSO also gives the user the opportunity to embed any decisions within a series of operations should be executed conditionally. This is done by calling CPDPDS at the users request.

The Process Dictionary is created during this phase of process. This is done by walking sequentially through the Layout file 290 via the forward pointers. For each symbol, in the Layout file 290 all functions that relate to that symbol are gathered from the various sections of the Result Table file 302 by use of the layout file index pointer associated with the symbol and written out in the Process Dictionary 304 containing the information necessary to create the appropriate COBOL statements. The process Dictionary record types correspond to standard COBOL verbs.

The CPDPWS function 262f creates working storage entries on the Internal Element file 286 if at either the CPDPRT function or the CPDPIS function it is necessary to create temporary work files.

As illustrated in FIG. 32 the source subsystem 264 utilizes the information contained in the files created by the six subsystems that preceded it to create COBOL source code. Source code is stored in the Source Dictionary file 306. The source subsystem 264 is the equivalent of a COBOL programmer. In this subsystem, all of the information created by the preceding subsystems is translated by the source subsystem 264 to COBOL source statements which taken together form a complete COBOL program which will compile error free on the standard system COBOL compiler. The source subsystem 264 uses the following files while it makes up the COBOL statements for the four main COBOL divisions:

Identification Division: (The control portion of the program is accessed for user ID information.)
  (1) The Application File 292
  (2) The Installation File 280
Enviornment Division:
  (1) Installation File 280
Data Division:
  (1) The Internal Element File 286
  (2) The File Dictionary 284
  (3) The Screen Dictionary 296
  (4) The Report Dictionary 298
  (5) The Installation File 280
Procedure Division:
  (1) The Process Dictionary 304
  (2) The Screen Dictionary 296
  (3) The Report Dictionary 298
  (4) The Layout File 290
  (5) The Installation File 280
  (6) The Ancestor File 294

The documentation subsystem 266 uses the same data base files as source only its output is documentation directed to the system's print spool.

The JCL subsystem produces JCL based on the information gathered during the first six subsystems. It also collects from the data base any installation specific JCL that was stored at installation which is needed and sends all the JCL to the spooler.

The spooling subsystem 270 collects the source and the JCL steams and send them to the system job queque for execution.

The clean-up subsystem cleans-up the overall data base for the application just completed.

Even though numerous characteristics and advantages of the invention have been set forth in the foregoing description, together with details of the structure and function of the invention, the disclosure is illustrative only, and changes may be made in detail, especially in matters of shape, size and arrangement of parts, within the principles of the invention, to the full extend indicated by the broad general meaning of the terms in which the appended claims are expressed.

What is claimed is:

1. A computer based system for the machine creation of application programs in high-level, programmer oriented language source code for use on a general purpose computer, comprising:
  (a) terminal means for user input and control of the computer based system;
  (b) display means for display of user input and output from the computer based system;
  (c) data processing means adapted to receive the user's input and based on the user's input create source code of the application program, said data processing means including:
    (i) layout means for creating an overall procedural flow of the application program being created, the overall procedural flow being represented by interconnected symbols selected from a predetermined set of symbol types representative of data processing functions, decision branches and input and output operations, the layout means providing for user selection and interconnection of individual ones of the symbols so as to form the overall procedural flow of the application program being created, the layout means including means for displaying at the display means at least some of the symbols of the overall procedural flow as the overall procedural flow is being created by the user, the layout means storing in a memory location of the computer based system identifier means for identifying the symbol type of each of the symbols selected by the user and identifier means for uniquely identifying each of the symbols selected by the user and further storing pointer means for indicating the interconnection between the symbols selected by the user, the layout means further including interactive editor means for adding and deleting symbols from the overall procedural flow of the application program being created so as to enable modification of the overall procedural flow of the application program being created, the layout means further including logic error means for verifying that there are no isolated procedural flow paths, the error means providing error warnings if any procedural flow path errors are so detected, (ii) file definition means for defining data files, the organization of data within the data files, and the methods of referencing the data files which will be utilized by the application program being created, (iii) screen definition means for defining the format of each display presentation, the input/output characteristics of each display presentation, and the sources of the data to be used for each display presentation to be employed by the application program being created, (iv) report definition means for defining the format and content of each report to be produced by the application program being created, and the sources of the data to be used for each report to be produced by the application program being created, (v) procedure generation means for partitioning the procedural flow of the application program being created into procedural divisions of the high-level, programmer oriented language source code of the application program being created, said procedure generation means further defining how and where each data element output by the application program being created is developed; and (vi) high-level programmer oriented language source code creation means which utilizes the procedural flow expressed in the layout means, the data files and structure defined in the file definition means, the display presentation format and input/output characteristics defined in the screen definition means, the report format and content definitions defined in the report definition means, and the procedure generation means, for creating a source language program for the application program being created, whereby said source language program will then be compiled by an appropriate compiler exactly as if it had been written by a human programmer to create a fully fashioned and complete object language program which can be executed on a general purpose computer in order to carry out the functions of the fully developed application program for the benefit of the user.

2. A computer based system in accordance with claim 1 wherein said procedure generation means includes:

(a) path decision means for defining the criteria for taking a particular procedural flow path at each of the decision branches in the overall procedural flow of the application program being created, the path decision means including means for selecting the decision branches whose criteria is to be defined and for indicating to the user the selected decision branch, the path decision means including prompt means for promoting the user to select the particular procedural flow path of the selected decision branch whose criteria is to be defined and for prompting the user to define the criteria for taking the selected procedural flow path, the path decision means further including interactive editor means for changing, adding and deleting any of the criteria for taking a particular procedural flow path at any of the decision branches;

(b) first data element derivation means for specifying how to derive data elements by defining the access key to each of the data files and the method for processing each of the data files supporting a particular data processing function, the data processing function producing each data element to be output by the application program being created, and temporary data elements needed to compute a value for each output data element;

(c) data input/ouput directive means for defining the sequence of multiple data inputs if occurring for a particular data processing function, the sequence of input and output in a display presentation for a particular data processing function which has both an input and an output, whether a data file which is to be output in a particular data processing function is to be written for the first time, overwritten after modifications, or have one or more records deleted; and (d) second data element derivation means for specifying how to compute a value for each data element assigned to a particular data processing function.

3. A computer based system in accordance with claim 1, wherein said data processing means further includes documentation means for generating documentation of the application program being created using the information created by the layout means, file definition means, screen definition means, report definition means and procedure generation means.

4. A computer based system in accordance with claim 1, wherein said data processing means further includes job control language creation means for generating the job control language for the final application object language program using the information created by the layout means, file definition means, screen definition means, report definition means, and procedure generation means.

5. An automated method for developing application programs from user input of non-procedural information describing the application via a terminal to create an application program for a general purpose computer, comprising:

(a) defining data processing functions and decision branches, input and output, and overall procedural flow governing the application program being created by use of interconnected graphic symbols input by the user at the terminal;

(b) defining data files supporting the application program being created, the organization of the data files, and how the data will be referenced by data element name in the data files;

(c) defining the format of display presentations providing a human interface to the application program being created, the input and output characteristics of the display presentations, and the source of the data to be used;

(d) defining the format and content of reports produced by the application program being created and the source of data to be used in the reports; and (e) interactively modifying the above steps at the terminal as required;

(f) defining the detailed procedural flow of the application program being created, including:

(i) defining the criteria for taking a particular path at each of the decision branches in the application program being created, (ii) defining where to obtain the various data elements of the application program being created, (iii) defining the order of the input and output directives required by each of the processing functions of the application program being created; and (iv) defining how each data element assigned to the processing functions is to be valued; and (g) creating the source code of the application program being created in a procedural, human readable high-level programmer oriented language from the information provided by the preceding steps.

6. A computer based system for creating procedural, human readable, high-level programmer oriented language source code of a data processing application program, comprising:

(a) a plurality of information processing symbol types representative of data processing functions from which a user may choose to build procedural flow paths for an application program being created, each symbol type having associated therewith a unique identifier;

(b) terminal means for user entry of the symbol types and display of same; and (c) data processing means adapted to receive graphical input symbols representative of the symbol type identifier entered by the user at the terminal means, including:

(i) layout means for storing the symbol type identifier in a Layout Data file means, the layout means associating with each of the symbol types and storing a unique pointer value representative of the order in which the symbol types are entered by the user at the terminal means, the layout means further storing in an Ancestor file means the pointer value of a symbol to which control passes in each procedural flow path and the pointer value of the symbol causing transfer to that particular procedural flow path, said layout means including means for validating the backward and forward pointers of each symbol type in the Layout file means to verify all the procedural flow paths are complete in a forward sense, said layout means including means for verifying the pointers of the Ancestor file means to verify there are no isolated procedural flow paths, said layout means including means for interactively editing the procedural flow paths;

(ii) means for gathering information regarding files, screens, and reports of the application program being created;

(iii) means for asking of the user additional information respecting the procedural flow paths and the symbol types therein; and (iv) means for automatically constructing application program source code based on the information so obtained.

7. A computer based system in accordance with claim 1, wherein the data processing means includes means for prompting the user in a predetermined fashion and for performing validity checks on the user's inputs in response thereto.

8. A computer based system in accordance with claim 7, wherein the display means includes two areas of display, a first area of display displaying the prompts of the data processing means and a second area of display displaying user selected symbols.

9. A computer based system in accordance with claim 1, wherein the error means further verifies that at least one of the procedural flow paths is terminated with a stop symbol type and for warning the user if none of the procedural flow paths is so terminated.

10. A computer based system for the machine creation of application programs in high-level, programmer oriented language source code for use on a general purpose computer, comprising:

(a) terminal means for user input and control of the computer based system;

(b) display means for display of user input and output from the computer based system;

(c) data processing means adapted to receive the user's input and based on the user's input create source code of the application program being created, the data processing means including:

(i) layout means for creating an overall procedural flow of the application program being created, the overall procedural flow being represented by interconnected symbols selected from a predetermined set of symbol types representative of data processing functions, decision branches and input and output operations, the layout means providing for user selection and interconnection of individual ones of the symbols so as to form the overall procedural flow of the application program being created, the layout means including means for displaying at the display means at least some of the symbols of the overall procedural flow as the overall procedural flow is being created by the user, the layout means storing in a memory location of the computer based system identifier means for identifying the symbol type of each of the symbols selected by the user and identifier means for uniquely identifying each of the symbols selected by the user and further storing pointer means for indicating the interconnection between the symbols selected by the user, the layout means further including interactive editor means for adding and deleting symbols from the overall procedural flow of the application program being created so as to enable modification of the overall procedural flow of the application program being created, the layout means further including logic error means for verifying that there are no isolated procedural flow paths, the error means displaying error warnings at the display means if any procedural flow path errors are so detected, (ii) file definition means for defining data files which will be utilized by the application program being created, the file definition means including prompt means for prompting the user to specify whether each of the data files present in the overall procedural flow of the application program being created is an existing file or a new file and for further prompting the user to define the organization of the data within the data files and the methods of referencing the data files, (iii) screen definition means for defining each display presentation utilized by the overall procedural flow of the application program being created, the screen definition means including prompt means for prompting the user to specify whether each of the display presentations present in the overall procedural flow of the application program being created is an existing display presentation or a new display presentation and for further prompting the user to define the format of the display presentations, the input/output characteristics and the sources of data to be used for each display presentation, (iv) report definition means for defining each report to be produced by the overall procedural flow of the application program being created, the report definition means including prompt means for prompting the user to specify for each report present in the overall procedural flow of the application program being created whether the report is an existing report or a new report and for further prompting the user to define the format and content of each report and the sources of the data to be used for each report, (v) procedure generation means for partitioning the procedural flow of the application program being created into procedural divisions of the high-level, programmer oriented language source code of the application program being created, the procedure generation means further defining how and where each data element output by the application program being created is developed; the procedure generation means including:

(a) path decision means for defining the criteria for taking a particular procedural flow path at each of the decision branches in the overall procedural flow of the application program being created, the path decision means including means for selecting a decision branch whose criteria is to be defined and for indicating to the user the selected decision branch, the path decision means including prompt means for prompting the user to select the particular procedural flow path of the selected decision branch whose criteria is to be defined and for prompting the user to define the criteria for taking the selected procedural flow path, the path decision means further including interactive editor means for changing, adding and deleting any of the criteria for taking a particular procedural flow path at any of the decision branches;

(b) first data element derivation means for specifying how to derive data elements which are to be output by the application program being created, the first data element derivation means including prompt means for prompting the user to define for each output in the overall procedural flow of the application program being created in which data processing functions the data elements will be defined and further prompting the user to define an access key to each of the data files and the method of processing each of the data files supporting the data processing functions wherein the data elements are defined;

(c) data input/output directive means for defining input/output operations occurring in the overall procedural flow of the application program being created, the data input/output directive means including means for prompting the user to define the sequence of multiple data inputs if occurring for a particular data processing function, the sequence of input and output in a display presentation for a particular data processing function which has both an input and an output, and whether a data file which is to be output in a particular data processing function is to be written for the first time, overwritten after modifications or have one or more records deleted; and (d) second data element derivation means including means for prompting the user to specify how to compute a value for each data element assigned to a particular data processing function;

(vi) high-level, programmer oriented language source code creation means which utilizes the procedural flow expressed in the layout means, the data files defined in the file definition means, the display presentations defined in the screen definition means, the reports defined in the report definition means and the procedure generation means for creating a source language program for the application program being created, whereby the source language program will then be compiled by an appropriate compiler as if it had been written by a human programmer to create a fully fashioned and complete object language program which can be executed on a general purpose computer in order to carry out the functions of the fully developed application program for the benefit of the user.

* * * * *

UNITED STATES PATENT AND TRADEMARK OFFICE
CERTIFICATE OF CORRECTION

PATENT NO. : 4,742,467

DATED : May 3, 1988

INVENTOR(S) : Messerich et al.

It is certified that error appears in the above-identified patent and that said Letters Patent is hereby corrected as shown below:

```
Title Page, Column 1 under References Cited, Line 3, "Van Den Hanenberg"
should be --van den Hananberg--.
Title Page, Abstract, Line 7, "input/ output" should be --input/output--.
Column 4, Line 51, "menues" should be --menus--.
Column 8, Line 24, "generated" should be --generates--.
Column 9, Line 25, "menues" should be --menus--.
Column 9, Line 68, after "function" insert --was--.
Column 10, Line 26, "a" should be --A--.
Column 10, Line 35, delete "or".
Column 10, Line 48, "he" should be --the--.
Column 10, Line 49, "along" should be --alone--.
Column 10, Line 57, after "appears" insert --on--.
Column 13, Line 52, "programmed" should be --program--.
Column 14, Line 10, "appilication" should be --application--.
Column 14, Line 35, "the the" should be --the--.
Column 14, Line 58, delete "a".
Column 15, Line 32, delete "this".
Column 15, Line 66, "indicate" should be --indicated--.
Column 17, Line 47, "a" should be --the--.
Column 17, Line 57, "programmed" should be --program--.
Column 18, Line 12, "The" should be --These--.
Column 20, Line 22, "Additions" should be --Addition--.
Column 21, Line 28, delete "used in the".
Column 22, Line 8, "A" should be --An--.
Column 22, Line 8, "ad" should be --as--.
Column 22, Line 17, delete "can".
Column 22, Line 43, delete "of each".
Column 22, Line 56, "an" should be --An--.
Column 22, Line 61, "distination" should be --destination--.
Column 23, Line 16, "logical" should be --logic--.
Column 24, Line 30, "to" should be --no--.
```

UNITED STATES PATENT AND TRADEMARK OFFICE
CERTIFICATE OF CORRECTION

PATENT NO. : 4,742,467

DATED : May 3, 1988

INVENTOR(S) : Messerich et al.

It is certified that error appears in the above-identified patent and that said Letters Patent is hereby corrected as shown below:

```
Column 26, Line 1, delete ".  The" and insert --including the--.
Column 26, Line 19, "of" should be --or--.
Column 26, Line 23, "effect" should be --affect--.
Column 26, Line 36, "step" should be --steps--.
Column 26, Line 39, "condition" should be --condition(s)--.
Column 27, Line 11, "detected" should be --dictated--.
Column 27, Line 17, "consistant" should be --consistent--.
Column 27, Line 39, "creases" should be --creates--.
Column 27, Line 42, after "operations" insert --which--.
Column 27, Line 44, "users" should be --user's--.
Column 28, Line 11, "Enviornment" should be --Environment--.
Column 28, Line 36, "send" should be --sends--.
Column 28, Line 46, "extend" should be --extent--.
Column 30, Line 15, "promoting" should be --prompting--.
```

Signed and Sealed this

Twenty-fifth Day of July, 1989

Attest:

DONALD J. QUIGG

Attesting Officer

Commissioner of Patents and Trademarks